(12) United States Patent
Itou et al.

(10) Patent No.: US 10,589,787 B2
(45) Date of Patent: Mar. 17, 2020

(54) POWER STEERING APPARATUS CONTROL DEVICE AND POWER STEERING APPARATUS

(71) Applicant: Hitachi Automotive Systems, Ltd., Hitachinaka-shi, Ibaraki (JP)

(72) Inventors: Takahiro Itou, Tokyo (JP); Kenta Maeda, Tokyo (JP); Kazuya Yamano, Atsugi (JP); Yasuhito Nakakuki, Atsugi (JP)

(73) Assignee: Hitachi Automotive Systems, Ltd., Hitachinaka-shi, Ibaraki (JP)

( * ) Notice: Subject to any disclaimer, the term of this patent is extended or adjusted under 35 U.S.C. 154(b) by 287 days.

(21) Appl. No.: 15/740,113

(22) PCT Filed: Jun. 9, 2016

(86) PCT No.: PCT/JP2016/067155
§ 371 (c)(1),
(2) Date: Dec. 27, 2017

(87) PCT Pub. No.: WO2017/002570
PCT Pub. Date: Jan. 5, 2017

(65) Prior Publication Data
US 2018/0186406 A1    Jul. 5, 2018

(30) Foreign Application Priority Data

Jun. 30, 2015 (JP) .................................. 2015-130565

(51) Int. Cl.
*B62D 15/02* (2006.01)
*B62D 1/28* (2006.01)
(Continued)

(52) U.S. Cl.
CPC ......... *B62D 15/0285* (2013.01); *B62D 1/286* (2013.01); *B62D 5/0463* (2013.01); *B62D 6/005* (2013.01); *B62D 5/0472* (2013.01)

(58) Field of Classification Search
CPC .. B62D 15/0285; B62D 1/286; B62D 5/0463; B62D 6/005
See application file for complete search history.

(56) References Cited

U.S. PATENT DOCUMENTS

2006/0089770 A1    4/2006  Ito
2007/0288142 A1   12/2007  Maeda et al.
(Continued)

FOREIGN PATENT DOCUMENTS

JP    H04-055168 A    2/1992
JP    H08-337181 A   12/1996
(Continued)

OTHER PUBLICATIONS

International Search Report with English translation and Written Opinion issued in corresponding application No. PCT/JP2016/067155 dated Aug. 30, 2016.
(Continued)

*Primary Examiner* — Michael D Lang
(74) *Attorney, Agent, or Firm* — Foley & Lardner LLP

(57) ABSTRACT

It is an object of the present invention to provide a power steering apparatus control device in which it is possible to suppress generation of the canceling of the automatic steering unintended by the driver.

The present invention provides a control device controlling the operation of a power steering apparatus in which there is selected either an assist control (28) in which a steering force is assisted based on a steering torque input through the operation of a steering wheel or an automatic steering control (29) in which a steering angle of a turning wheel is
(Continued)

controlled based on a steering angle command value. When, in the state in which the automatic steering control (29) is selected, the steering torque exceeds a predetermined threshold value, the automatic steering control (29) is canceled and the assist control (28) is selected. There is set a steering angle velocity command value in accordance with an increase amount of the steering torque due to the turning based on the automatic steering control (29), whereby there is performed a canceling suppression control in which canceling of the automatic steering control (28) is suppressed.

20 Claims, 20 Drawing Sheets

(51) Int. Cl.
*B62D 5/04* (2006.01)
*B62D 6/00* (2006.01)

(56) References Cited

U.S. PATENT DOCUMENTS

| 2013/0041557 | A1 | 2/2013 | Endo et al. |
| 2015/0353125 | A1* | 12/2015 | Tsubaki ................. B62D 1/286 |
| | | | 701/42 |

FOREIGN PATENT DOCUMENTS

| JP | 2002-200985 A | 7/2002 |
| JP | 2003-237607 A | 8/2003 |
| JP | 2006-117181 A | 5/2006 |
| JP | 2007-326453 A | 12/2007 |
| JP | 2013-205254 A | 10/2013 |
| JP | 2014-234146 A | 12/2014 |
| WO | WO-2011/152214 A1 | 12/2011 |

OTHER PUBLICATIONS

Japanese Office Action issued in Application No. 2015-130565, dated Apr. 2, 2019 and English machine translation thereof.

* cited by examiner

POWER STEERING APPARATUS CONTROL DEVICE AND POWER STEERING APPARATUS

TECHNICAL FIELD

The present invention relates to a control device for a power steering apparatus performing automatic steering and a power steering apparatus.

BACKGROUND ART

There exists a control device for a steering apparatus such as a power steering apparatus which has an assist mode in which, based on the driving condition of the vehicle, controls an actuator equipped with a motor, etc. to impart a steering auxiliary force to the steering force of the driver, and an automatic steering mode in which a target steering angle is generated based on a command value of a host controller and in which the actuator is controlled to automatically adjust a turning wheel steering angle. In an example of such a steering apparatus, switching is effected from the automatic steering to the assist when the steering torque of the driver detected by a torque sensor during automatic steering has attained a predetermined value (threshold value) or more (see, for example, Patent Document 1 below).

Further, there is a steering apparatus in which, in order to suppress the steering wheel vibration during automatic steering, a twist angle generated in a torsion bar is detected and in which the electric current command value of a motor is calculated based on the twist angle and a twist angle differential value to control the motor (see, for example, Patent Document 2 below).

Further, there has been proposed a steering apparatus in which a target steering angle is corrected such that the angular acceleration of the target steering angle during automatic steering is a limitation value or less and in which, based on information on the turning angle, the motor is controlled such that the turning angle is in conformity with the corrected target steering angle (see, for example, Patent Document 3 below).

PRIOR ART DOCUMENTS

Patent Documents

Patent Document 1: JP-1992-55168-A
Patent Document 2: JP-2003-237607-A
Patent Document 3: International Publication No. 2011/152214

SUMMARY OF THE INVENTION

Problem to be Solved by the Invention

However, to realize a smooth parking when performing parking by automatic steering, a high speed turning at a relatively large steering angle is required. In the case where the steering apparatus disclosed in Patent Document 1 is used, with respect to the high speed operation driven by the motor on a side of the tire side rather than the torsion bar, the operation on the side of the steering wheel rather than the torsion bar is delayed due to the inertial force of the steering wheel. Thus, a difference is generated between the rotation angle of the pinion and the rotation angle of the steering wheel (a twist angle), and the steering torque calculated based on the twist angle increases even if there is no steering by the driver. When the threshold value torque at which the automatic steering mode undergoes transition to the assist mode is exceeded, there is the possibility of the automatic mode being canceled to effect transition to the assist mode against the will of the driver.

In the steering apparatus disclosed in Patent Document 2, it is possible to suppress the vibration of the steering wheel in the case of low speed turning or turning in a minute amount. However, in the case where a high speed turning of large steering angle is performed as in the case of automatic steering at the time of parking, there is the possibility of an abrupt change in the motor current value being abruptly changed. The smoothness of the steering wheel operation is impaired, whereby there is the possibility of the driver experiencing uneasiness and its being difficult to suppress the twist angle sufficiently small.

In the steering apparatus disclosed in Patent Document 3, in order that the steering angle acceleration may not exceed the limitation value, it is necessary to set the limitation value for generating the target steering angle in accordance with the dynamics of the power steering apparatus. In the process, it is necessary to take into consideration the individual variation of the components, changes in viscous resistance in accordance with the temperature, etc. Thus, in the case where the steering angle acceleration limitation value is set supposing a condition in which torsion bar twist is most likely to be generated, despite the fact that it is possible to operate at a higher acceleration and to perform high-speed turning in an operational environment/condition without generation of torsion bar twist, the turning is performed at a lower speed.

The present invention has been made in view of the above problems. It is an object of the present invention to provide a power steering apparatus control device and a power steering apparatus in which in the case where a high speed turning of large steering angle is performed during automatic steering, it is possible to suppress generation of the canceling of the automatic steering unintended by the driver.

Means for Solving the Problem

To achieve the above object, there are provided, in accordance with the present invention, a power steering apparatus control device and a power steering apparatus in which there is selected either an assist control in which a steering force is assisted based on a steering torque input through the operation of a steering wheel or an automatic steering control in which a steering angle of a turning wheel is controlled based on a steering angle command value. When, in the state in which the automatic steering control is selected, the steering torque exceeds a predetermined threshold value, the automatic steering control is canceled and the assist control is selected. There is set a steering angle velocity command value in accordance with an increase amount of the steering torque due to turning based on the automatic steering control, whereby there is performed a canceling suppression control in which canceling of the automatic steering control is suppressed.

Effect of the Invention

In the power steering apparatus control device of the present invention, in the case where there is generated a twist angle (steering torque) of the torsion bar installed between the input shaft to which the steering wheel is connected during automatic steering and the output shaft to the steering mechanism, a target steering angle velocity is corrected by a target speed corrector correcting the target steering angle velocity, making it possible to operate the power steering apparatus such that the automatic steering is not canceled against the will of the driver. The steering angle velocity and the steering torque vary in accordance with the operating condition of the power steering apparatus and the condition of the road surface on which the tires are grounded. On this account, these are fed back, and there is performed a control in conformity with the corrected target steering angle velocity, whereby it is possible to perform control to suppress the generation of steering torque during automatic steering taking into consideration the operational environment and condition of the power steering apparatus. Thus, according to the present invention, the canceling of the automatic operation unintended by the driver is not generated in a situation in which a high speed turning of large steering angle is required during the automatic steering.

MODES FOR CARRYING OUT THE INVENTION

Figure 1:
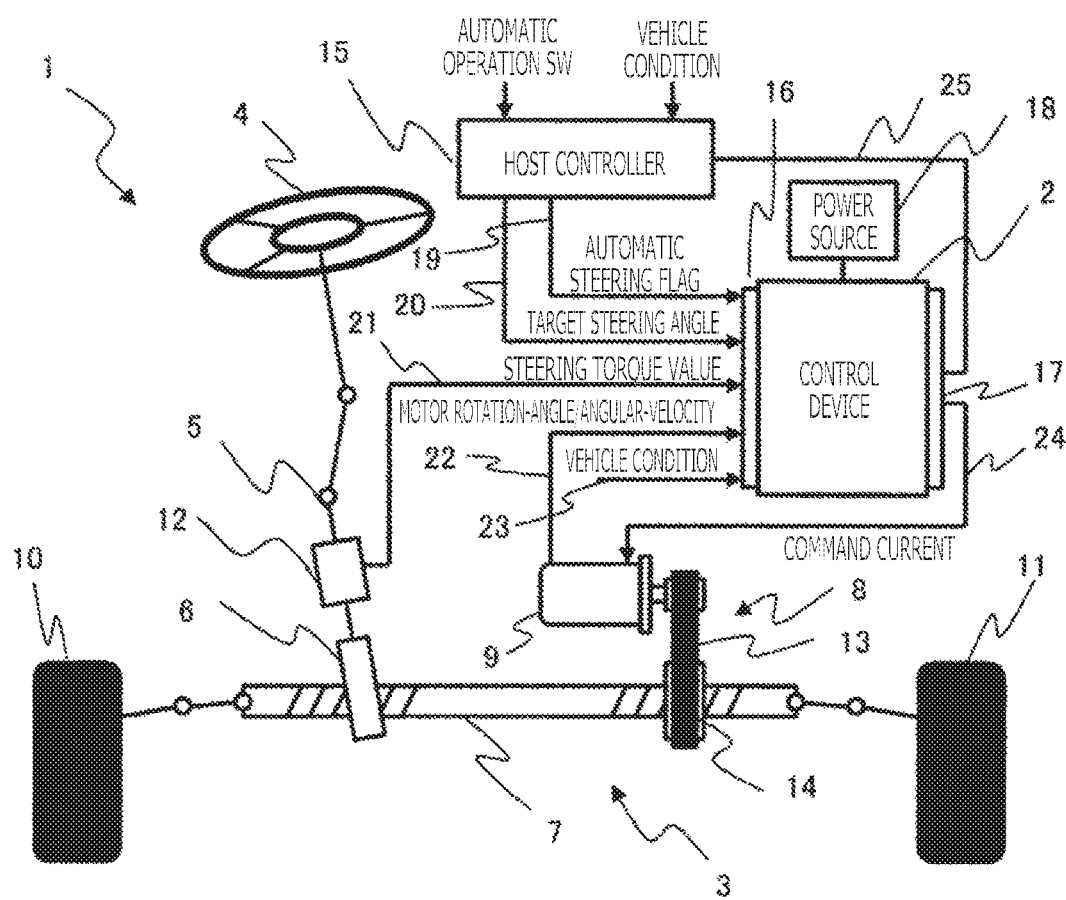
FIG. 1 is a schematic diagram illustrating the construction of a power steering apparatus 1 and a control device 2.

FIG. 1 is a schematic diagram illustrating the control device 2 for a power steering apparatus, and a power steering apparatus 1 equipped with the same. Roughly speaking, the power steering apparatus 1 is composed of the control device 2 and a steering mechanism 3.

The steering mechanism 3 has a steering wheel 4, a steering shaft 5, a pinion shaft 6, and a rack shaft 7. A motor 9 is connected to the rack shaft 7 via a speed reduction mechanism 8. When the steering wheel 4 is operated by the driver, the rotation is transmitted to the pinion shaft 6 via the steering shaft 5. The rotational motion of the pinion shaft 6 is converted to a linear motion of the rack shaft 7. As a result, left and right turning wheels 10 and 11 connected to both ends of the rack shaft 7 are turned. Rack teeth in mesh with the pinion shaft 6 are formed on the rack shaft 7. The rack shaft 7 converts rotational motion to linear motion through the rack and pinion mechanism.

A torque sensor 12 is provided between the steering shaft 5 and the pinion shaft 6. The torque sensor 12 outputs a steering torque based on a twist angle of a torsion bar (not shown). The torsion bar is arranged at the connection portion of the steering shaft 5 and the pinion shaft 6.

As the speed reduction mechanism 8 connected to the motor 9, there is employed, for example in FIG. 1, a ball screw 14 driven by a belt/pulley 13 mounted to the output shaft of the motor 9. Due to this construction, the torque of the motor 9 is converted to a translation direction force of the rack shaft 7. As the speed reduction mechanism 8, it is possible to employ a construction using a rack and pinion as in the case of the steering wheel 4 input, or a construction directly driving the nut of the ball screw by a hollow motor.

Input to a host controller 15 are a signal from an automatic operation switch (SW) operated when the driver selects the control by automatic steering, a vehicle condition signal obtained from a camera, a sensor, map information and the like provided in the vehicle, etc. When the automatic steering switch is operated by the driver and the vehicle control by automatic operation is selected, a vehicle path is generated based on the vehicle condition signal, and, to realize the same, there are output an automatic steering flag 19 causing the control device 2 of the power steering apparatus 1 to execute an automatic steering control, and a target steering angle 20 required of the power steering apparatus 1.

The control device 2 is equipped with an input terminal 16 and an output terminal 17. Further, a power source 18 is connected to the control device 2. Input to the input terminal 16 of the control device 2 are vehicle condition signals 23 such as the automatic steering flag 19, the target steering angle 20, a steering torque value 21, a motor rotational-angle/rotational-speed 22, and the vehicle speed. Output from the output terminal 17 of the control device 2 are a motor control electric current 24 computed by the control device 2, a signal 25 transmitting the operating condition of the power steering apparatus 1 to the host controller 15, etc.

In the following, embodiments of the control device 2 for the power steering apparatus 1 and the power steering apparatus 1 according to the present invention will be described with reference to the drawings. In the drawings, the same components are indicated by the same reference characters, and a redundant description will be left out.

First Embodiment

Figure 2:
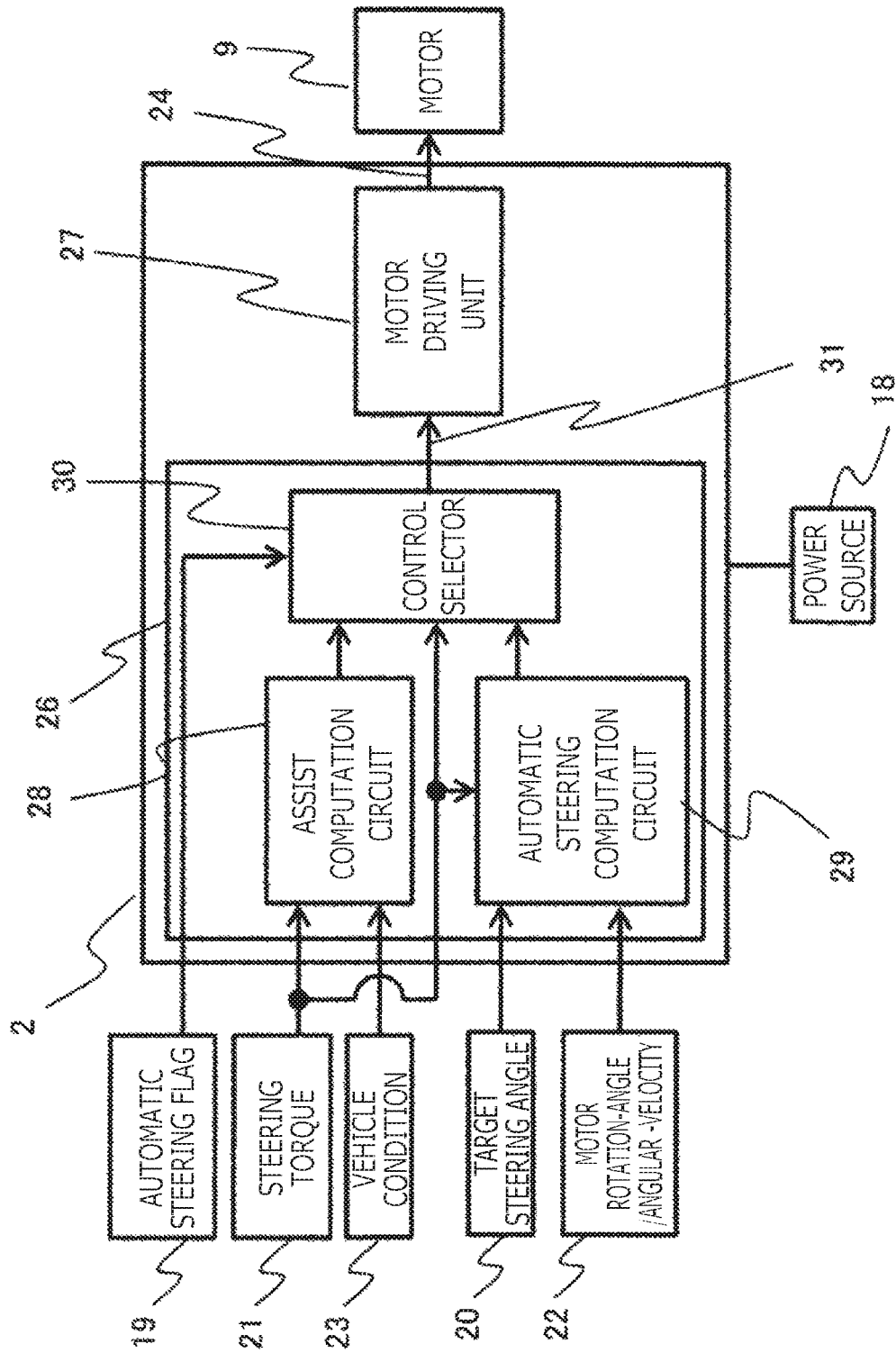
FIG. 2 is a schematic diagram illustrating the construction of the control device 2 of the power steering apparatus 1 according to embodiment 1.

FIG. 2 schematically shows the construction of the control device 2 according to the first embodiment. As shown in FIG. 2, the control device 2 is composed of a required torque generation unit 26, and a motor driving unit 27 having a motor control circuit and a motor driving circuit. The control device 2 is driven by electric power supplied from the power source 18.

In FIG. 2, the required torque generation unit 26 is composed of an assist computation circuit 28, an automatic steering computation circuit 29, and a control selector 30. The assist computation circuit 28 computes the required torque of the motor 9 in an assist mode in which the steering by the driver is assisted. The automatic steering computation circuit 29 computes the torque required of the motor 9 in an automatic steering mode in which the steering angle is automatically matched with the target steering angle 20. The control selector 30 selects between required torque of the assist mode and that of the automatic steering mode based on the value of the automatic steering flag 19 of the host controller 15.

In the present embodiment, both the required torque of the assist mode and that of the automatic steering mode are constantly calculated, and the control selector 30 selects one of them. It is, however, also possible to adopt a construction in which the mode is previously selected by the control selector 30 and in which the computation for solely one of the assist mode and the automatic steering mode is conducted.

Figure 3:
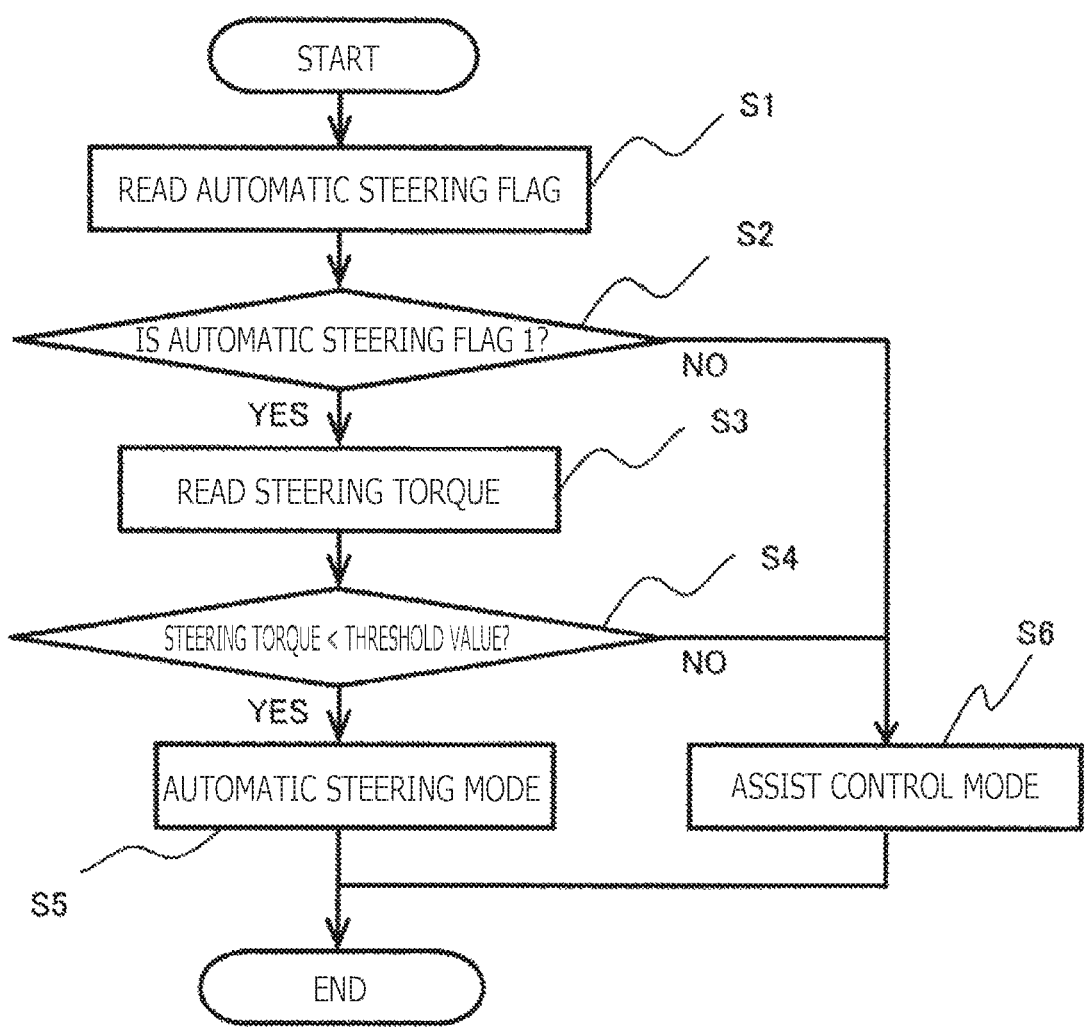
FIG. 3 is a flowchart illustrating the processing by a control selector 30 according to embodiment 1.

FIG. 3 is a flowchart illustrating the operation of the control selector 30. The control selector 30 reads the automatic steering flag 19 output from the host controller 15, and determines which of the automatic steering and the assist steering has been selected (step S1). For example, in FIG. 3, the procedure advances to step S3 when the value of the automatic steering flag 19 is 1. Otherwise, the computation result of the assist computation circuit is selected as the required torque 31 (step S6).

In the case where the procedure advances to step S3, the steering torque 21 is read, and it is determined which of the steering torque 21 and the steering torque threshold value is larger. The steering torque threshold value is advisably determined referring, for example, to the steering torque of the driver during normal operation. In the case where it is determined that the steering torque 21 is smaller than the steering torque threshold value, it is assumed that the steering torque 21 as aimed at by the driver has not been generated, and the computation result of the automatic steering computation circuit is selected as the required torque 31 (step S5). On the other hand, in the case where it is determined that the steering torque 21 is the threshold value or more, it is assumed that the steering torque 21 as aimed at by the driver has been generated, and the computation result of the assist computation circuit is selected as the required torque 31 (step S6).

In the present embodiment shown in the flowchart of FIG. 3, when the steering torque 21 exceeds the threshold value if for an instant, the computation result of the assist computation circuit is used as the required torque. To exclude the influence of noise, etc. of the torque sensor, however, the computation result of the assist computation circuit may be regarded as the required torque 31 in the case where, for example, a plurality of samplings by the control device 2 indicate that the steering torque 21 is always in excess of the threshold value, or in the case where the value obtained after the filtering of the steering torque 21 exceeds the threshold value.

The computation processing by the assist computation circuit 28 shown in FIG. 2 will be described. The assist computation circuit 28 determines the required torque 31 with respect to the motor 9 in accordance with the magnitude of the steering torque 21 generated through the turning by the driver by means of the steering wheel 4. In this process, vehicle condition information 23 such as the vehicle speed may be utilized, varying the assist force imparted to the rack shaft 7 in accordance with the vehicle speed.

The motor driving unit 27 computes the requisite motor target electric current value for realizing the required torque value 31 by the motor control circuit. Based on the computation result, the motor driving unit 27 operates the motor driving circuit to effect control/output such that the motor electric current 24 flowing through the motor coincides with the target electric current value. At the time of the assist mode, a translation direction force is imparted to the rack shaft 7 via the speed reduction mechanism 8 by the motor torque realizing the required torque 31, assisting the driver such that he can operate with a small steering torque.

Figure 4:
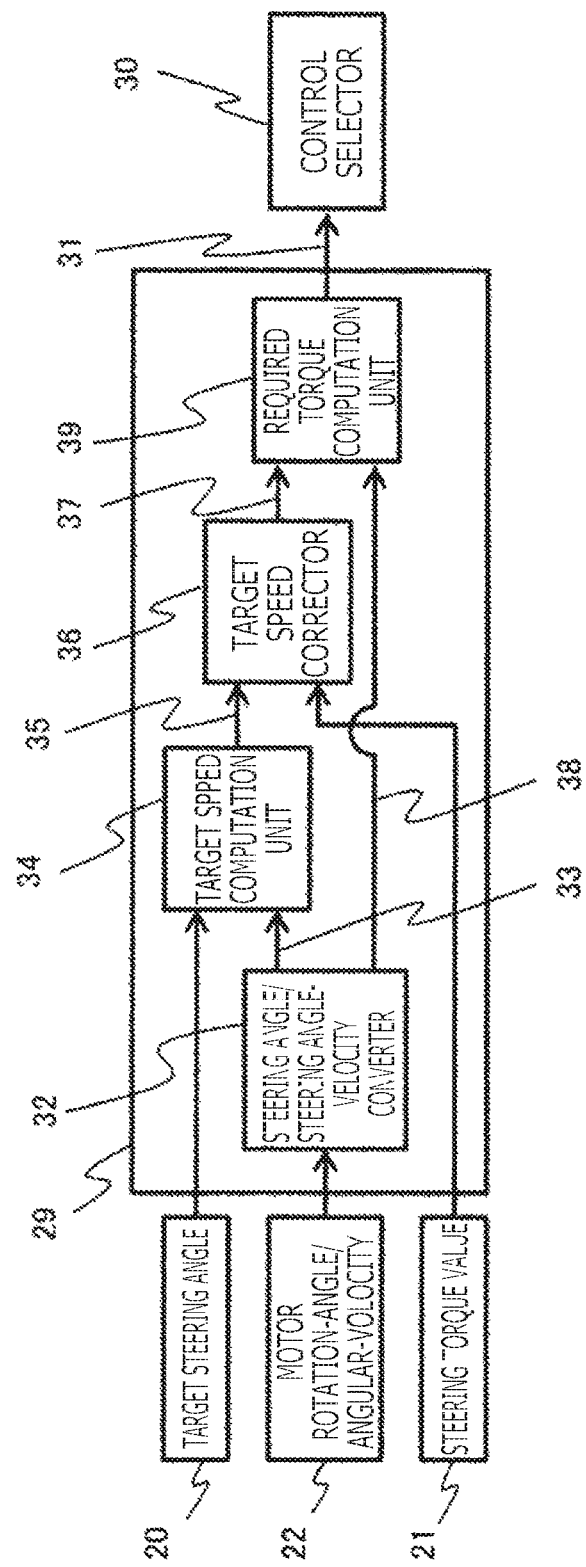
FIG. 4 is a schematic diagram illustrating the construction of an automatic steering computation circuit 29 according to embodiment 1.

FIG. 4 is a schematic diagram illustrating the construction of the automatic steering computation circuit 29. The automatic steering computation circuit 29 has a steering/steering-angle velocity converter 32, a target speed computation unit 34, a target speed corrector 36, and a required torque computation unit 39. The steering/steering-angle velocity converter 32 converts a motor rotational-angle/angular-velocity signal to the actual-steering-angle/actual-steering-angle velocity. The target speed computation unit 34 computes the target steering angle velocity 35 of the power steering apparatus 1 based on the target steering angle 20 and the actual steering angle 33. The target speed corrector 36 corrects the target steering angle velocity 35 based on the steering torque 21, and computes a corrected target steering angle velocity 37. The required torque computation unit 39 computes the required torque 31 with respect to the motor 9 based on the corrected target steering angle velocity 37 and the actual steering angle velocity 38.

Figure 5:
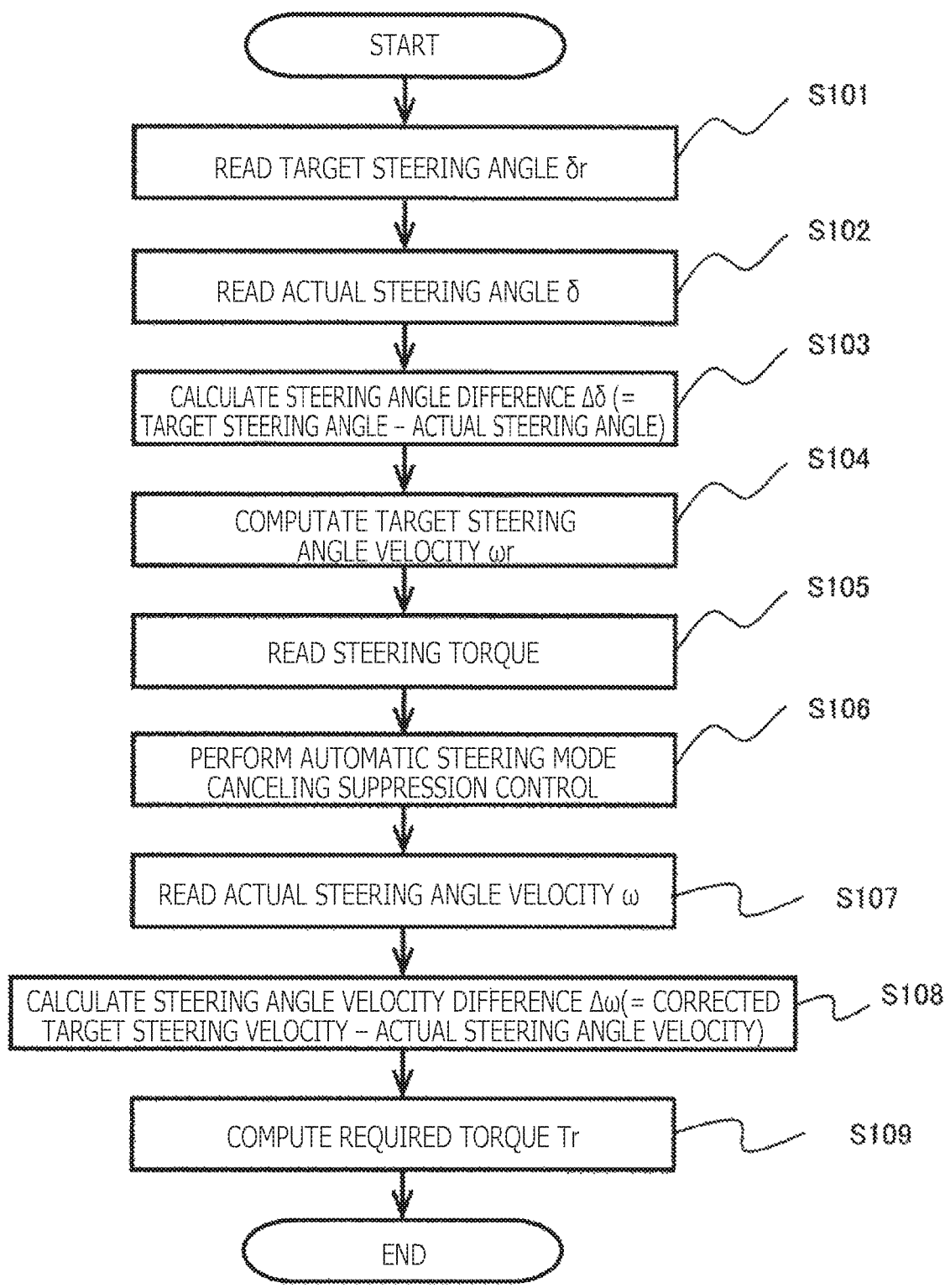
FIG. 5 is a flowchart illustrating the processing by the automatic steering computation device 29 according to embodiment 1.

FIG. 5 is a flowchart illustrating the computation processing by the automatic steering computation unit 29. When the control is started, the target speed computation unit 34 reads the steering angle target value δr (target steering angle 20) computed by the host controller 15 (step S101). Next, the actual steering angle δ (actual steering angle 33) computed by the steering-angle/steering-angle velocity converter 32 (S102), and the steering angle difference Δδ(=target steering angle δr−actual steering angle δ) (S103). Next, the target speed computation unit 34 computes the target steering angle velocity ωr (target steering angle 35) based on the steering angle difference Δδ (step S104). Next, the target speed corrector 36 reads the steering torque 21 (step S105), and corrects the target steering angle velocity ωr (target steering angle velocity 35) to perform automatic steering canceling suppression control (step S106). In step S10, the corrected target steering angle velocity 37 is computed. The automatic steering canceling suppression control will be described in detail below. Next, the required torque computation unit 39 reads the actual steering angle velocity ω (actual steering angle velocity 38) computed by the steering-angle/steering-angle velocity converter 32 (step S107). In step S108, the steering angle velocity difference Δω(=target steering angle velocity ωr−actual steering angle velocity ω). By using this steering angle velocity difference Δω, the required torque computation unit 39 computes the required torque Tr (required torque 31) with respect to the motor 9 (step S109). The required torque Tr is output to the motor driving unit 27 via the control selector 30.

From this onward, as stated in the description of the assist mode, the requisite motor target electric current value for realizing the required torque 31 is computed by the motor control circuit, and, based on the computation result, the motor driving circuit is operated to perform control such that the motor electric current 24 flowing through the motor coincides with the target electric current value. Through this operation, the motor 9 imparts the translation direction force to the rack shaft 7 via the speed reduction mechanism 8, driving the power steering apparatus 1 so as to match it with the target steering angle.

Figure 6:
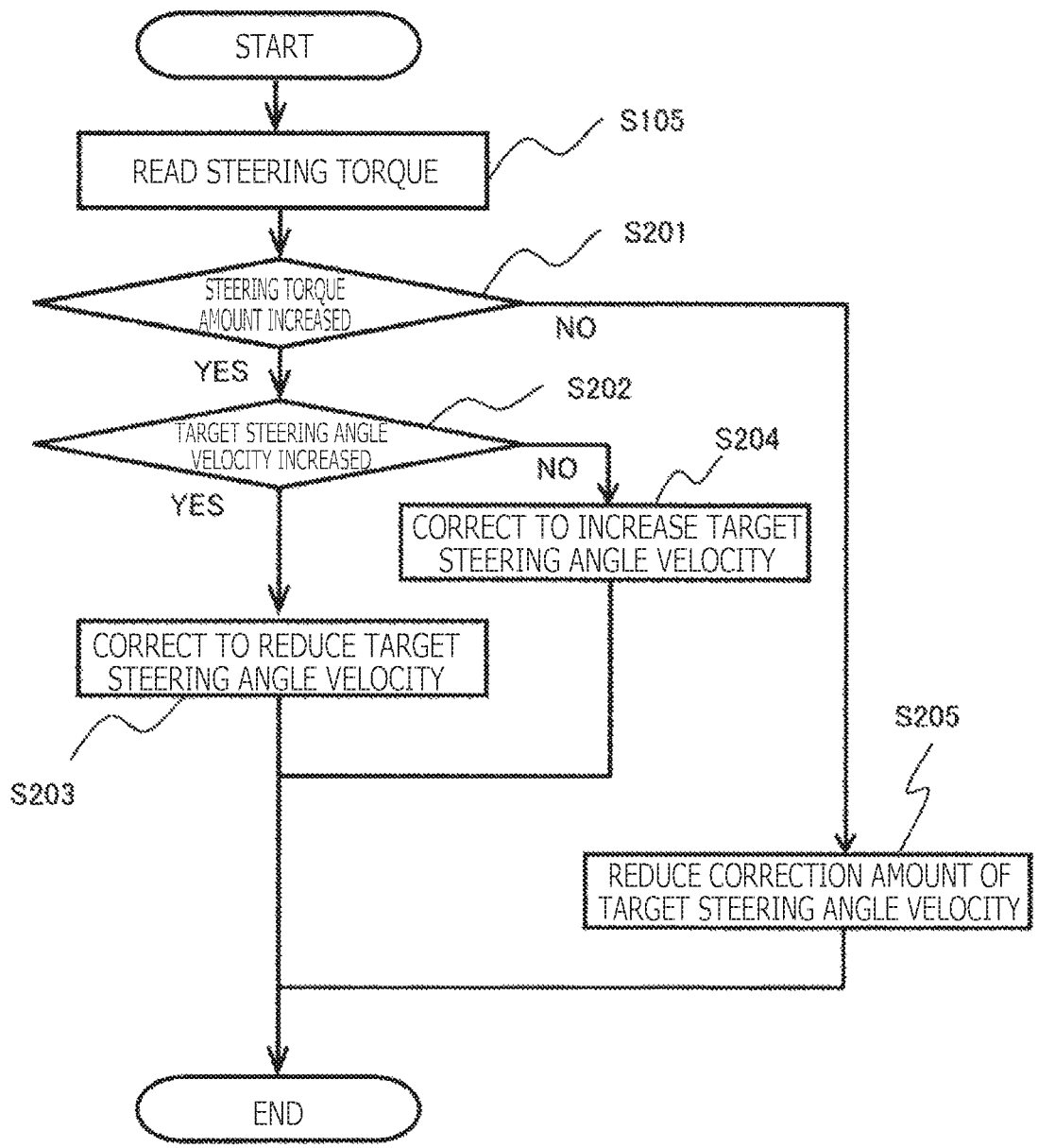
FIG. 6 is a flowchart illustrating the processing by a target speed corrector 36 according to embodiment 1.

FIG. 6 is a flowchart illustrating the processing by the target speed corrector 36. The target speed corrector 36 determines whether or not the steering torque amount has increased based on the steering torque 21 read in step S105 of FIG. 5 (step S201).

In the case where the steering torque 21 has increased, it is determined whether or not the target steering angle velocity ωr has increased (step S202). In the case where the target steering angle velocity ωr has increased, correction is performed to reduce the target steering angle velocity (a correction amount corresponding to the reduction is added) (step S203). In the case where the target steering angle velocity ωr has decreased, correction is performed to increase the target steering angle velocity ωr (a correction amount corresponding to the increase is added) (step S204). The correction amount is calculated based on, for example, the magnitude of the steering torque. The larger the steering torque generated, the larger the correction amount.

In the case where it is determined in step S201 that the steering torque 21 has decreased, the correction amount of the target steering angle velocity reduced (In the case where there is no correction amount, the target steering angle velocity is not changed) (step S205).

Figure 7:
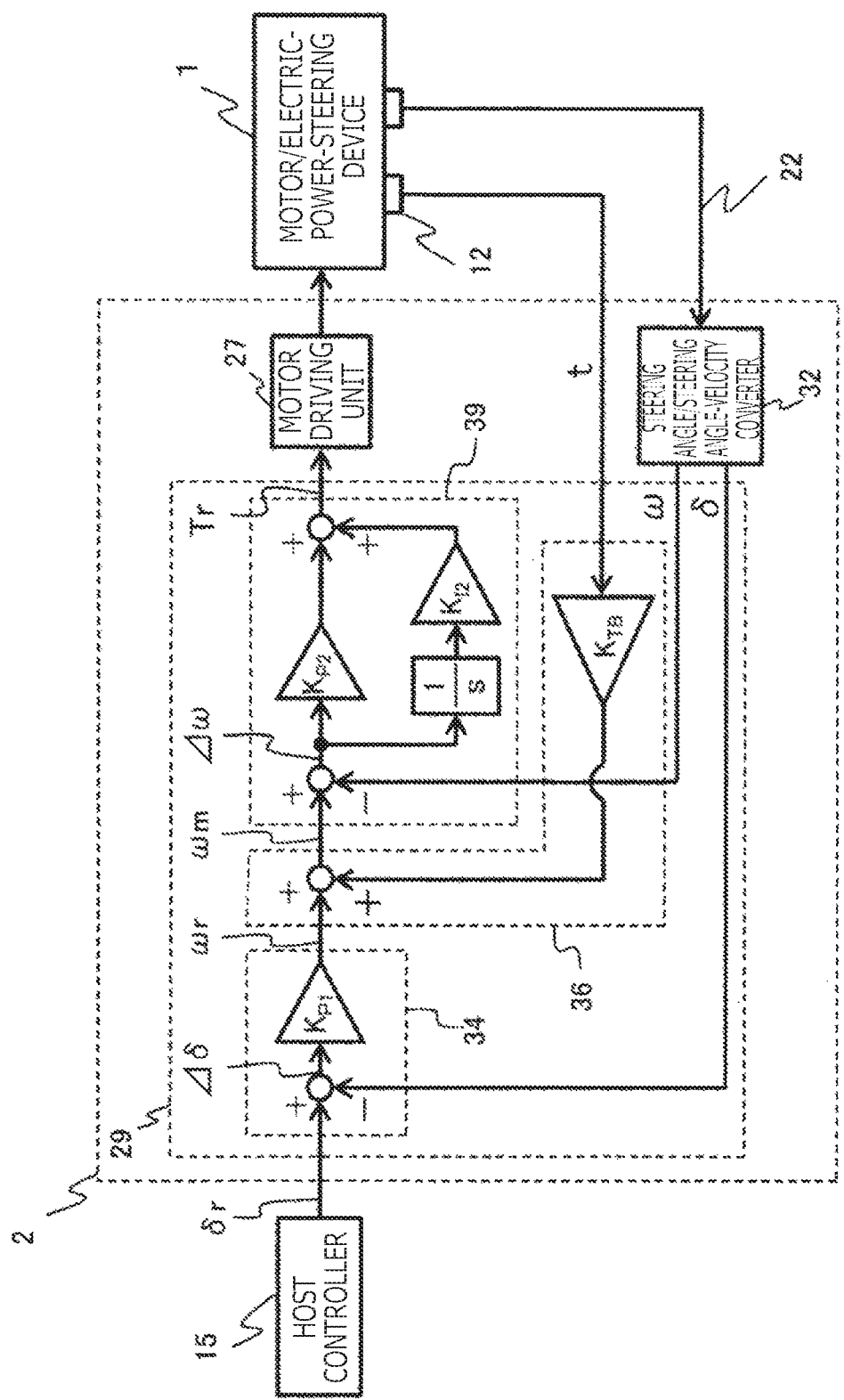
FIG. 7 is a block diagram illustrating a construction example of the control system of the automatic steering computation device 29 according to embodiment 1.

FIG. 7 is a block diagram illustrating the automatic steering computation shown in the form of flowcharts in FIGS. 5 and 6. Here, symbol s indicates a Laplacean. $K_{P1}$ indicates a proportional gain. The actual steering angle δ and the actual steering angle velocity ω are output from the steering-angle/steering-angle velocity converter 32 based on the motor rotational angle and the motor angular velocity output from a rotation angle sensor installed on the motor 9. The target speed computation unit 34 of FIG. 7 computes the target steering angle velocity ωr from the following equation (1).

$$\omega r = K_{P1} \Delta \delta = K_{P1}(\delta r - \delta) \quad (1)$$

Further, the target speed corrector 36 corrects the target steering angle velocity ωr by equation (2) to attain the corrected target steering angle velocity ωm.

$$\omega m = \omega r + K_{TB} t \quad (2)$$

Here, $K_{TB}$ indicates the gain, t indicates the steering torque, and $K_{TB}t$ indicates the correction amount. Here, according to equation (2), there is generated a steering torque of a sign opposite the sign of the steering angle velocity. By using equation (2), the target steering angle velocity is corrected as shown in the flowchart of FIG. 6. That is, when the steering torque amount t increases, the $K_{TB}t$ of the second term of equation (2) increases. However, the sign of the steering angle velocity is opposite the sign of the steering torque, so that, in the case where the target steering angle velocity has increased (ωr>0), $K_{TB}t$ is a negative value, and correction is performed to reduce the target steering angle velocity. Conversely, in the case where the target steering angle velocity has decreased (ωr<0), $K_{TB}t$ is a positive value, and correction is performed to reduce the target steering angle velocity. In the case where the steering torque amount t decreases, the $K_{TB}t$ correction amount is reduced.

Further, while in the target speed corrector 36 in FIG. 7, addition is performed to the target speed ωr after the gain, in some cases, setting is made to subtraction taking into account the sign when the steering torque is detected.

The required torque computation unit 39 computes the required torque Tr by equation (3). Here, $K_{P2}$ indicates a proportional gain, and $K_{I2}$ indicates an integral gain.

$$Tr = \left(K_{P2} + \frac{K_{I2}}{s}\right)\Delta\omega = \left(K_{P2} + \frac{K_{I2}}{s}\right)(\omega m - \omega) \quad (3)$$

Figure 8:
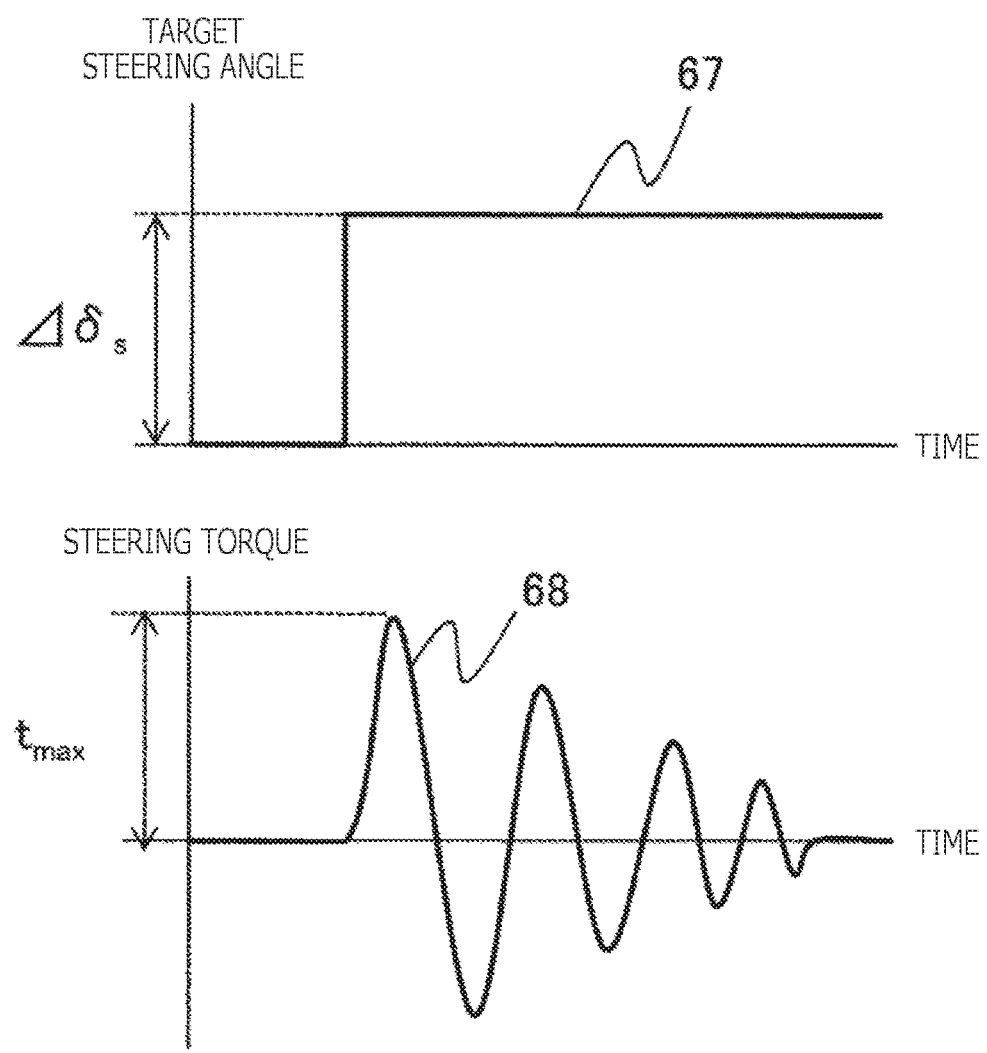
FIG. 8 is a diagram illustrating an output example of a steering torque in the case where a step-like target steering angle is input to the control device 2.

FIG. 8 is a diagram illustrating an output example of the steering torque 68 of the power steering apparatus 1 generated when a step-like target steering angle 67 is input to the control device 2. Here, suppose the steering angle difference between the front and rear portions of the step of the step-like target steering angle 67 is Δδs, and that the magnitude of the steering torque maximum value is $t_{max}$.

Figure 9:
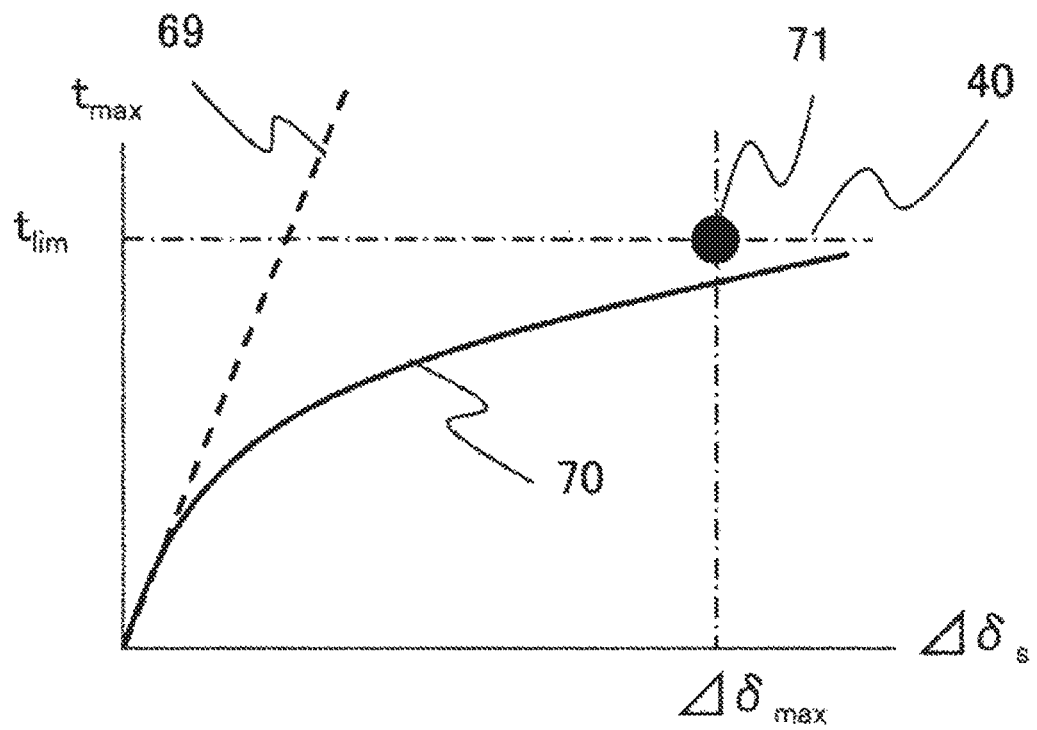
FIG. 9 illustrates an example of the control result of the control device 2 according to embodiment 1.

FIG. 9 illustrates the relationship between $t_{max}$ and Δδs. In the diagram, the horizontal axis indicates the steering angle difference Δδs between the front and rear portions of the step, and the vertical axis indicates the magnitude of the steering torque maximum value at that time $t_{max}$. In FIG. 9, the solid line 70 indicates the behavior of the power steering apparatus 1 equipped with the control device 2 of the present embodiment. The dotted line 69 indicates, as a comparative example, the behavior of the power steering apparatus 1 not equipped with the control device 2 of the present embodiment.

Referring to the dotted line 69, as the steering angle difference between the front and rear portions of the step of the step-like target steering angle input Δδs increases, the turning wheel 10, 11 side is caused to move faster than the pinion shaft 6 by the motor 9. Thus, the angle difference between the steering shaft 5 delayed in operation due to the inertial force of the steering wheel 4 and the pinion shaft 6, and the magnitude of the steering torque maximum value generated $t_{max}$ increases.

On the other hand, as indicated by the solid line 70, in the power steering apparatus 1 equipped with the control device 2 of the present embodiment, as the steering angle difference Δδs before and after the step-like input increases, the change in the steering torque maximum value $t_{max}$ decreases. The change amount of $t_{max}$ can be adjusted by the gain $K_{TB}$. However, when, in particular, turning is performed at the maximum steering angle velocity required of the power steering apparatus 1, it is advisable to design $K_{TB}$ such that it is below the coordinates 71 (Δδ$_{max}$, $t_{lim}$) in the graph of FIG. 9. Here, Δδ$_{max}$ is the steering angle difference changing at one-time control cycle of the control device 2, and $t_{lim}$ is the steering torque threshold value 40 for automatic steering canceling.

The control device 2 of the power steering apparatus 1 constructed as described above can control the operation such that, during automatic steering, the steering torque 21 of the power steering apparatus does not exceed the steering torque threshold value 40 for automatic steering canceling.

Figure 10:
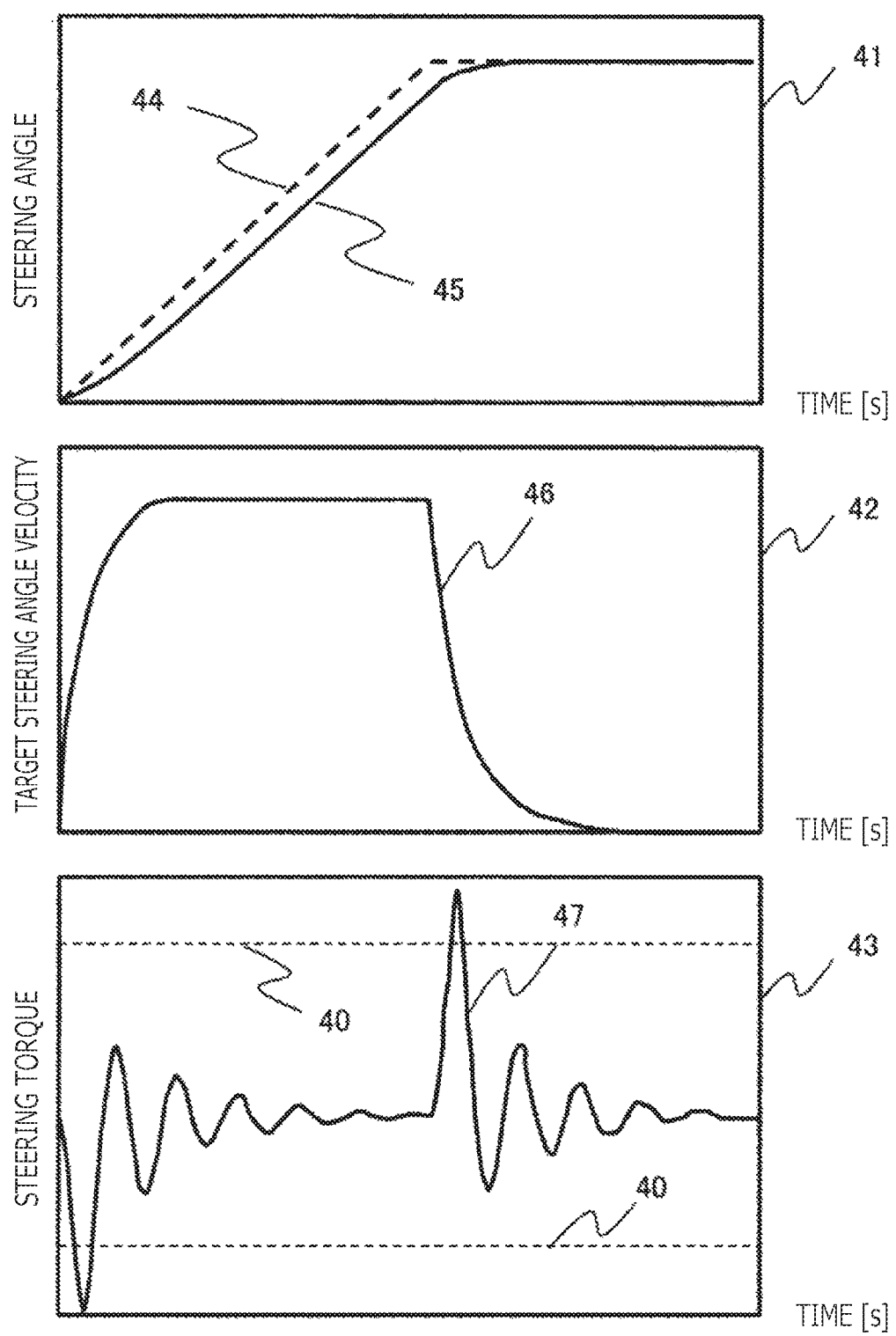
FIG. 10 illustrates an example of the operation of the power steering apparatus 1 according to a comparative example.

FIG. 10 shows, as a comparative example, an example of the operation of the power steering apparatus 1 not equipped with the control device 2 of the present embodiment. FIG. 10 shows the time change 41 of the steering angle, the time change 42 of the target steering angle velocity, and the time change 43 of the steering torque in a case where automatic steering is performed with a relatively high steering angle speed, while the host controller 15 is performing automatic steering such as automatic parking. It is to be assumed that, during the operation shown in FIG. 10, the automatic steering is not canceled even if the steering torque threshold value is exceeded.

The dotted line 44 of the time change 41 of the steering angle indicates the target steering angle generated by the host controller 15. The solid line 45 indicates the actual steering angle of the power steering apparatus 1 not equipped with the control device 2 of the present embodiment as the result of the control with respect to the target steering angle of the dotted line 44. Further, the solid line 46 indicates the time change of the target steering angle velocity with respect to the target steering angle of the dotted line 44. While the pinion shaft 6 operates substantially in accordance with the solid line 46 of the time change 42 of this target steering angle velocity, the steering wheel 4 connected via the torsion bar and the steering shaft 5 is delayed in operation due to the inertial force. Thus, the torsion bar is twisted, and, as indicated by the solid line 47 of the time change 43 of the steering torque, the steering torque is generated even if there is no operation by the driver. This solid line 47 indicates the case where steering is performed at a relatively large steering angle velocity, so that a large steering torque is generated immediately after the start and the stopping, and, as can be seen, that exceeds the steering torque threshold value 40 for the automatic steering canceling indicated by the dotted line. Thus, during the control of the actual automatic steering, transition is effected from the automatic steering to the assist steering at the point in time when the steering torque exceeds the steering torque threshold value 40 for the automatic steering canceling at the start.

Figure 11:
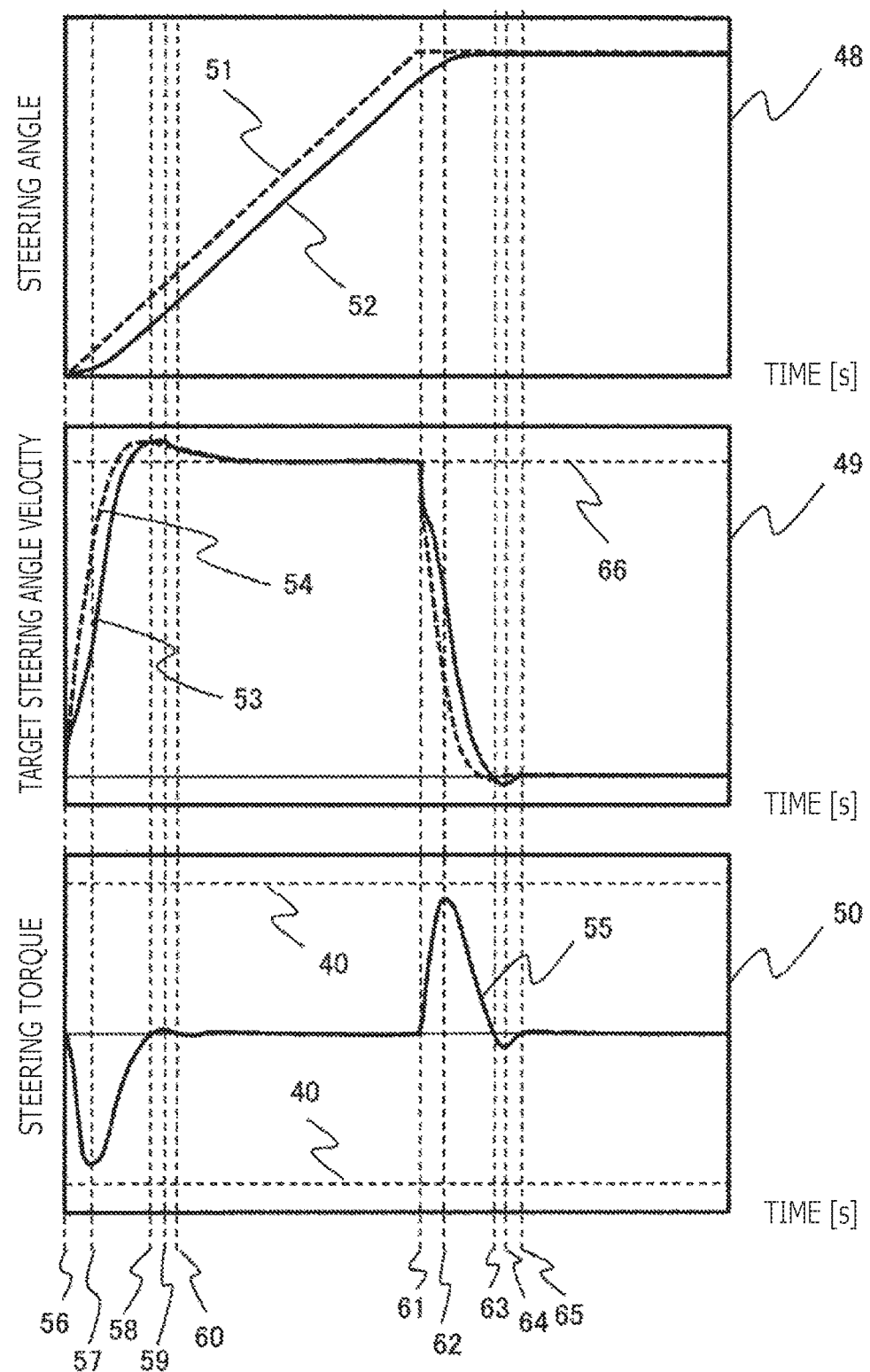
FIG. 11 illustrates an example of the operation of the power steering apparatus 1 according to embodiment 1.

In contrast, FIG. 11 shows an example of the operation of the power steering apparatus 1 equipped with the control device 2 of the present embodiment. Also in FIG. 11, the time change 48 of the steering angle, the time change 49 of the target steering angle velocity, and the time change 50 of the steering torque. It is to be assumed that the host controller 15 of FIG. 11 imparts the same steering angle target value as that of FIG. 10 to the control device 2.

In the time change 48 of the steering angle, the dotted line 51 indicates the target steering angle imparted by the host controller 15, and the solid line 52 indicates the actual steering angle of the power steering apparatus 1 as controlled by the control device 2. The dotted line 54 indicating the time change 49 of the target steering angle velocity indicates the target steering angle velocity 35 computed by the target speed computation unit 34 of the control device 2, and the solid line 53 indicates the corrected target steering angle velocity 37 computed by the target speed corrector 36. The solid line 55 indicating the time change 50 of the steering torque indicates the steering torque detected by the torque sensor 12 of the power steering apparatus 1 driven by the control device 2 of the present embodiment, and the dotted line 40 indicates the steering torque threshold value for the automatic steering canceling which is the same as that of FIG. 10.

As shown in FIG. 11, in the section between the point in time 56 and the point in time 60 in which the target steering angle 51 starts to increase, the actual steering angle is changed as indicated by the solid line 52. At this time, with respect to the rotation of the pinion shaft 6, a side of the steering wheel 4 is delayed in motion than the torsion bar, so that the torsion bar is twisted, and the steering torque fluctuates as indicated by the solid line 55.

In the section between the point in time 56 and the point in time 57, the steering torque amount indicated by the solid line 55 increases. This steering torque amount is detected by the torque sensor 12, and the value obtained by reducing the target steering angle velocity as shown in the same section of the solid line 53 through computation by the target speed corrector 36 is regarded as the corrected target steering angle velocity. As a result, the peak of the steering torque at the start is lower than that of FIG. 10.

In the section between the point in time 57 and the point in time 58, the steering torque amount is reduced as indicated by the solid line 55. On this account, as indicated by the solid line 53, the correction amount of the target steering angle velocity is reduced, and the corrected target steering angle velocity is increased.

In the section between the point in time 58 and the point in time 59, the steering torque amount increases again as indicated by the solid line 55. In this section, the target steering angle velocity is reduced. On this account, by adding the correction amount, there is obtained a corrected steering angle velocity in which the target steering angle velocity is increased, and the change in speed is reduced.

In the section between the point in time 59 and the point in time 60, the magnitude of the steering torque indicated by the solid line 55 is reduced. On this account, the correction amount is reduced, and, thereafter, there is generated a corrected target steering angle velocity coinciding with the target steering angle velocity. As a result of these controls, it is possible to quickly suppress the vibration of the steering torque generated by the torsion bar being twisted, which is generated when the power steering apparatus 1 starts to move.

In the section from the point in time 60 to the point in time 61, no steering torque is generated, so that the target steering angle velocity is not corrected (the target steering angle velocity and the corrected target steering angle velocity coincide with each other). Thus, turning is performed at a fixed speed.

The section between the point in time 61 and the point in time 65 corresponds to the braking section in which transition is effected from the turning state to the stopping state.

In the section between the point in time 61 and the point in time 62, there is no increase in the target steering angle, and the turning of the power steering apparatus 1 is braked. At this time, the reduction in rotational speed on the steering shaft 5 side does not catch up with the reduction in the rotational speed of the pinion shaft 6, and the torsion bar is twisted, with the result that, in the section between the point in time 61 and the point in time 62, there is generated a steering torque as indicated by the solid line 55.

In the section between the point in time 61 and the point in time 62, the steering torque amount indicated by the solid line 55 has increased, and this is detected by the torque sensor 12. In this section, the steering angle velocity is reduced. On this account, by the computation by the target speed corrector 36, there is generated a corrected target steering angle velocity in which a correction amount is added to the target steering velocity, and the change in the steering angle velocity is reduced. As a result, the peak of the steering torque generated at the time of braking indicated by the solid line 55 is suppressed low.

In the section between the point in time 62 and the point in time 63, the steering torque amount is reduced as indicated by the solid line 55. On this account, the correction amount of the target steering angle velocity is reduced as indicated by the solid line 53, and the corrected target steering angle velocity is increased.

In the section between the point in time 63 and the point in time 64, the steering torque amount increases again. In this section, the target steering angle velocity has increased. On this account, there is generated a corrected target steering angle in which a correction amount is subtracted from the target steering angle velocity.

In the section between the point in time 64 and the point in time 65, the steering torque amount indicated by the solid line 55 is reduced. On this account, the correction amount is reduced. After this, there is generated a corrected target steering angle velocity coinciding with the target steering angle velocity. Due to these controls, it is possible to quickly suppress the vibration of the steering torque as in the case of the starting.

As shown in FIG. 9, the power steering apparatus 1 driven by the control device 2 of the present embodiment corrects the target steering angle velocity, and drives the power steering apparatus 1 such that the steering torque threshold value 40 is not exceeded. Thus, the generation amount of the steering torque is suppressed, and even if turning is performed at high steering speed, there is generated no canceling of the automatic operation unintended by the driver.

Further, when the steering torque of the steering angle at the time of acceleration or braking is generated, the control device 2 of the present embodiment determines the correction amount in accordance with the magnitude of the steering torque to suppress the change in speed. Conversely, when the steering torque decreases, it reduces the correction amount to augment the change in speed. Thus, it is possible to perform automatic steering at a maximum speed at which the steering torque does not exceed the steering torque threshold value, making it possible to realize a smooth automatic parking.

Further, in the present embodiment, the steering torque measured by the torque sensor is fed back to determine the correction amount, so that it is possible to perform a correction in conformity with the actual operating condition of the power steering apparatus 1 which varies in accordance with the use environment, etc. Thus, it is possible to realize a control absorbing the individual variation of the components and the changes in viscous resistance.

Further, due to the construction which corrects the target steering angle velocity and which has a required torque computation unit for realizing a corrected target steering angle velocity, the feedback value of the steering angle velocity calculated from the motor rotational angle velocity includes information on the condition of the power steering apparatus 1 and the road condition, so that it is possible to perform a control in conformity with the actual use environment.

Further, due to the construction in which the steering speed is corrected and in which there is provided a required torque computation unit on the output side, it is possible to compute the required torque so as to smoothly connect the corrected steering angle velocity and the actual steering angle velocity, so that even when turning is performed at a relatively large steering angle velocity, it is possible to suppress the vibration of the steering wheel.

Further, while in FIG. 1 illustrating the present embodiment the steering angle input to compute the required torque is obtained from the sensor mounted to the motor, any other sensor will help to attain substantially the same effect so long as it is a sensor which is mounted to a side of the turning wheel rather than the torsion bar constituting the torque sensor 12 such as the pinion shaft 6 rotation sensor and the rack shaft 7 stroke sensor and which can detect the movement amount and movement speed of the portion connected to the motor 9.

Further, while the control device 2 of the present embodiment shown in FIG. 1 is imparted the target steering angle from the host controller 15, it is possible to attain an equivalent effect if there is adopted a construction which has no host controller 15 and which generates the target steering angle within the control device 2 based on information on the condition of the automatic steering switch and on the vehicle condition.

Further, while in the present embodiment described above the target steering angle velocity is corrected by using the steering torque detected by the torque sensor 12, it is possible to attain an equivalent effect if there is adopted a construction in which a rotational angle sensor is provided on the side of the steering wheel 4 rather than the torsion bar and in which the twist angle generated in the torsion bar is obtained by using this rotational angle sensor, correcting the target steering angle velocity based on the twist angle.

Second Embodiment

Next, a power steering apparatus control device and power steering according to the second embodiment will be described. The basic construction of the power steering apparatus 1 and the control device according to the present embodiment is the same as that of FIG. 1, and a description thereof will be left out.

Figure 12:
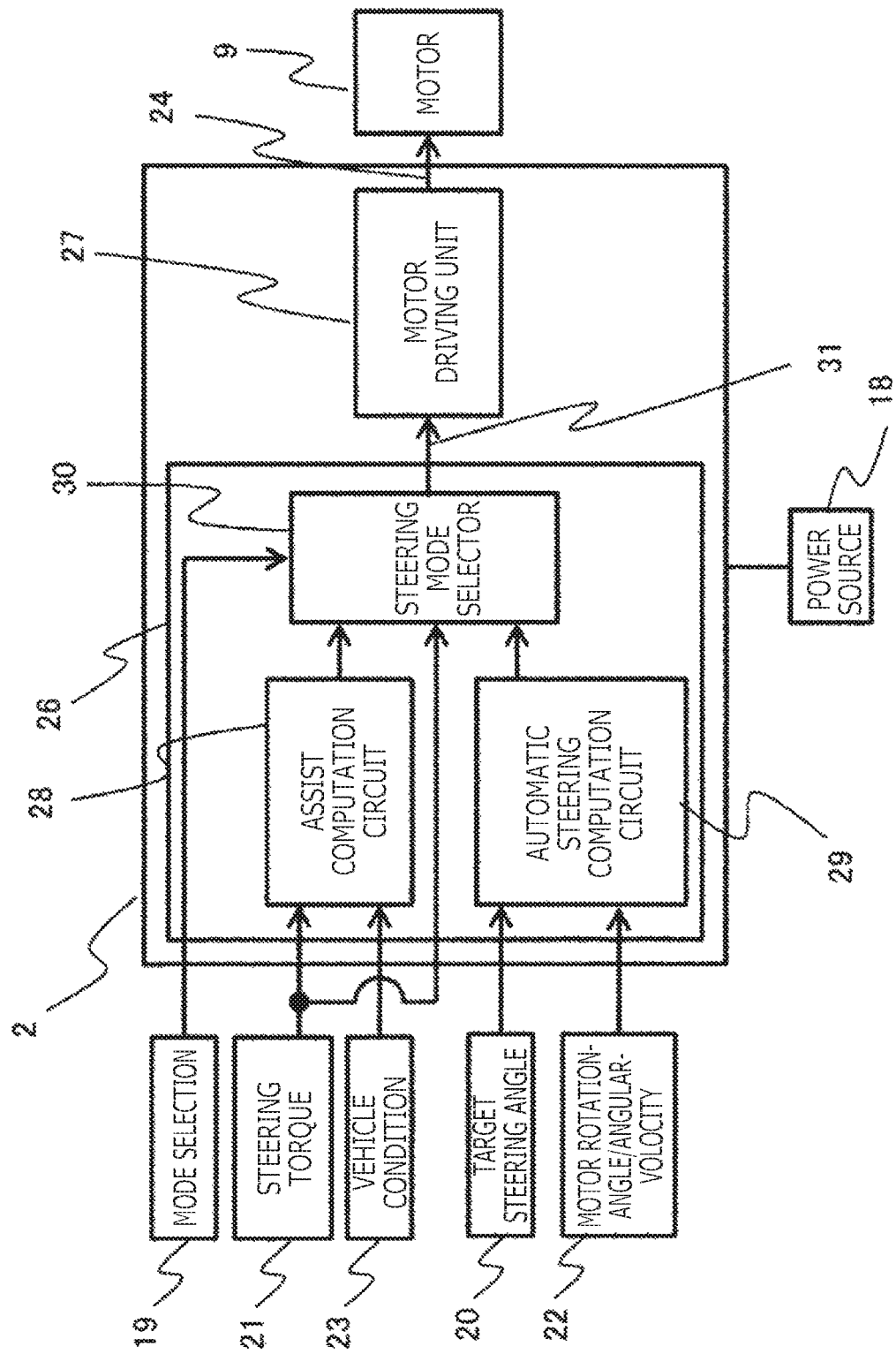
FIG. 12 is a schematic diagram illustrating the construction of the control device 2 of the power steering apparatus 1 according to embodiment 2.

FIG. 12 schematically shows the construction of the control device 2 of the present embodiment. The diagram differs from FIG. 2 showing the construction of the first embodiment in that the steering torque is not input to the automatic steering computation circuit 29. Otherwise, it is of the same construction as that of FIG. 2, so a description thereof will be left out.

Figure 13:
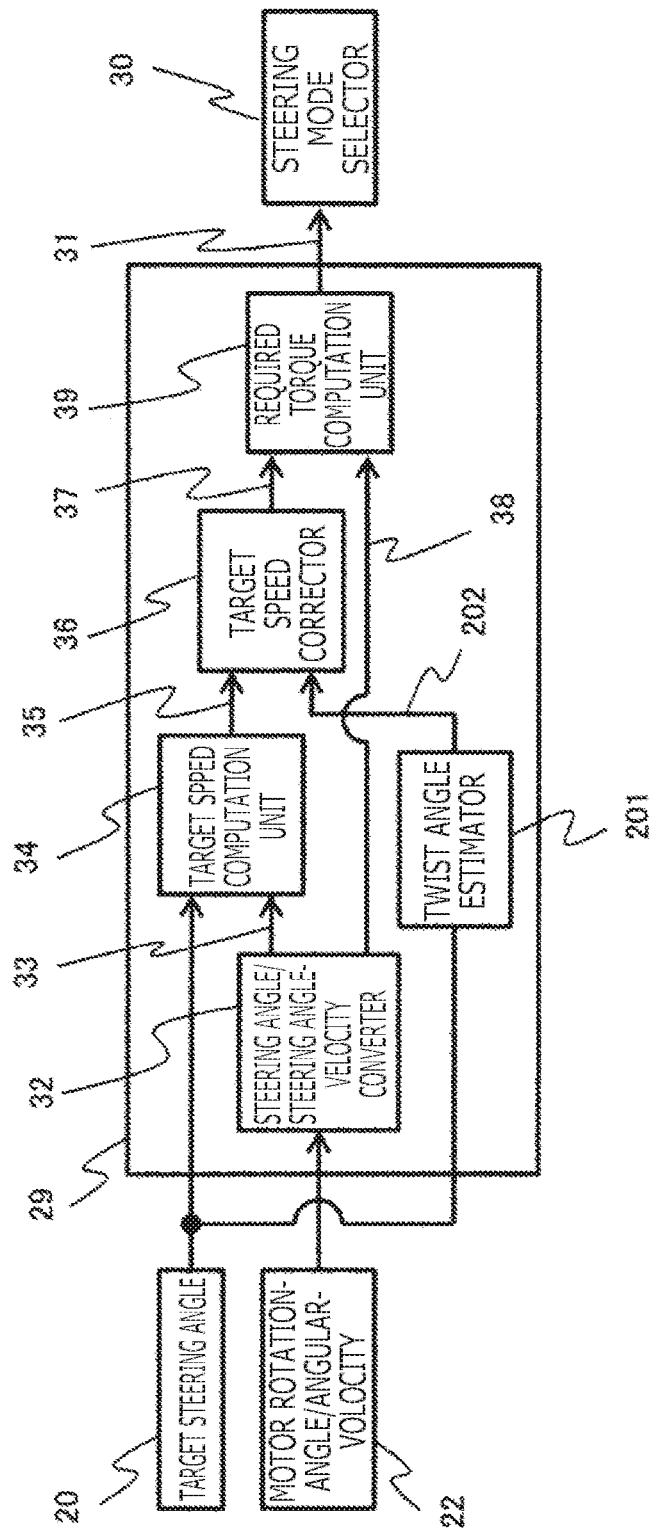
FIG. 13 is a schematic diagram illustrating the construction of the automatic steering computation circuit 29 according to embodiment 2.

FIG. 13 schematically shows the automatic steering computation circuit 29 of the present embodiment. FIG. 13 differs from FIG. 4 which shows the automatic steering computation circuit 29 of the first embodiment in that there is provided a twist angle estimator 201 and that an estimated twist angle 202 is input to the target speed corrector. A description of the construction common to the embodiments will be left out.

The twist angle estimator 201 estimates the twist angle by using the following equation (4). Equation (4) is an equation of motion around the steering shaft. Symbol J indicates the inertia on the side of the steering wheel 4 rather than the torsion bar, symbol Cc indicates the attenuation coefficient around the steering shaft 6, symbol $K_T$ indicates the rigidity of the torsion bar, and symbol $C_T$ indicates the torsional viscosity of the torsion bar.

$$J\ddot{\theta}+C_T(\dot{\theta}-\dot{\delta})+C_c\dot{\theta}+K_T(\theta-\delta)=0 \qquad (4)$$

Equation (5) can be derived through Laplace transformation of equation (4).

$$\frac{Y}{X} = \frac{sC_T + K_T}{Js^2 + (C_T + C_O)s + K_T} \qquad (5)$$

Here, X indicates the Laplace transformation of δ, and Y indicates the Laplace transformation of θ. Equation (5) corresponds to the transfer function from the pinion shaft side steering angle around the steering shaft. Further, assuming that the Laplace transformation of the twist angle is Z, the transfer function of the twist angle with respect to the steering angle of the pinion shaft is to be expressed by equation (6).

$$\frac{Z}{X} = \frac{Y-X}{X} = \frac{-Js^2 - C_c s}{Js^2 + (C_T + C_C)s + K_T} \quad (6)$$

The estimated twist angle 202 of the torsion bar is computed from the pinion shaft rotational angle calculated from the motor rotational angle by using the transfer function expressed by equation (6).

As stated in connection with the first embodiment, by measuring the twist angle by the sensor for detecting the rotational angle of the steering shaft and by using it instead of the steering torque, it is possible to attain a correction effect substantially equivalent to that by the target speed corrector 36. Thus, if the target steering angle velocity is corrected by using the estimated twist angle 202 shown in the present embodiment, it is possible to execute a substantially equivalent automatic steering canceling suppression control.

Third Embodiment

Figure 14:
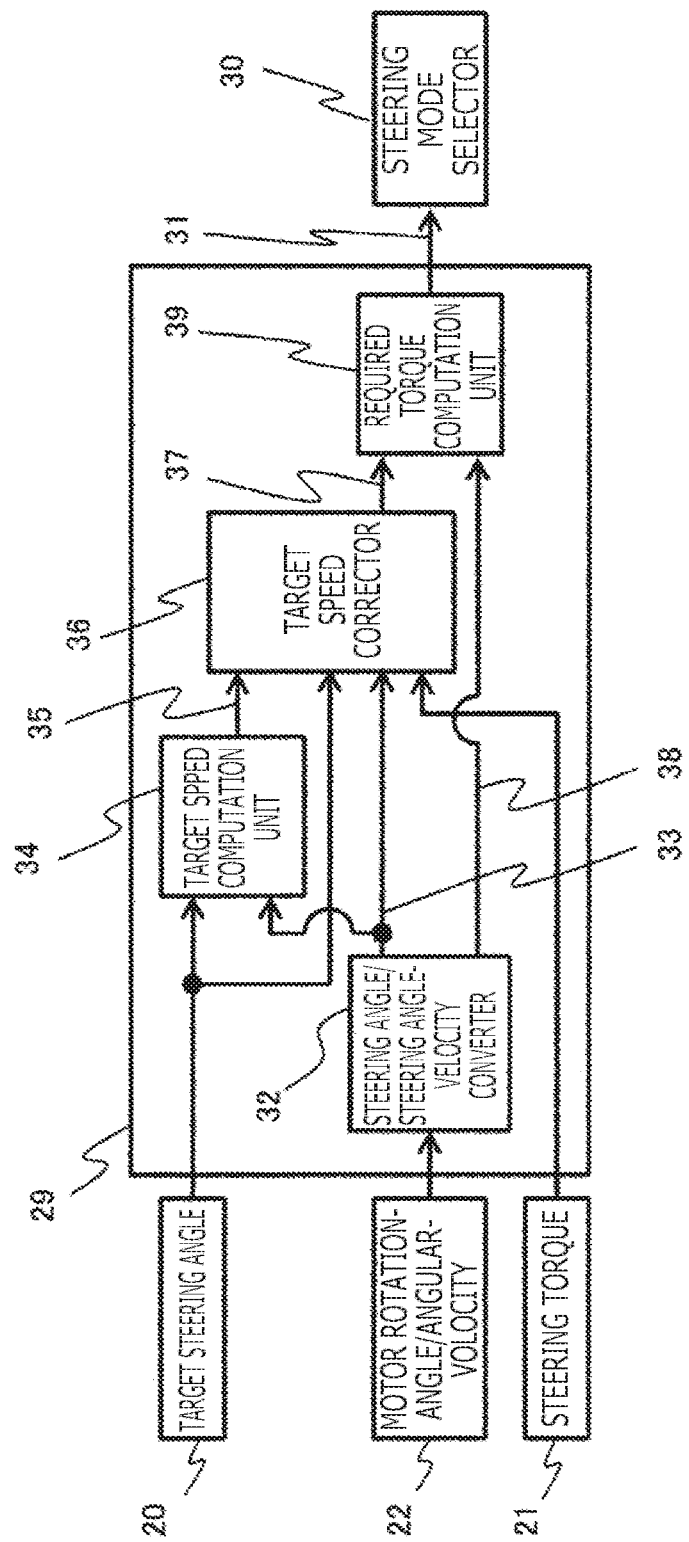
FIG. 14 is a schematic diagram illustrating the construction of the automatic steering computation circuit 29 according to embodiment 3.

FIG. 14 shows the construction of the automatic steering computation circuit 29 according to the third embodiment. It differs from the first embodiment in that the target steering angle 20 and the actual steering angle 33 are input to the target speed corrector 36. Otherwise, it is the same as the construction of FIG. 4, so a description thereof will be left out.

Figure 15:
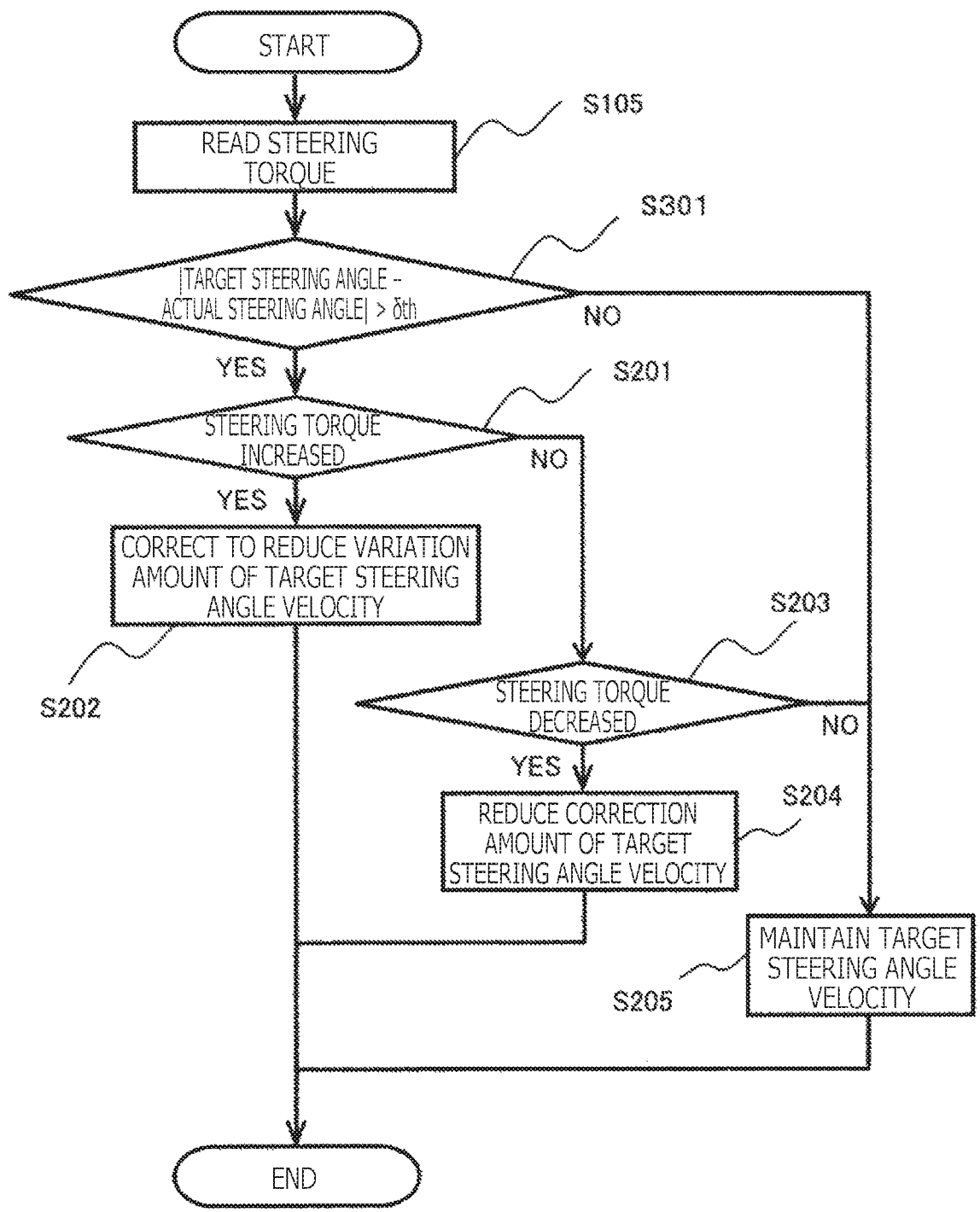
FIG. 15 is a flowchart illustrating the processing by a target speed corrector 34 according to embodiment 3.

FIG. 15 is a flowchart illustrating the processing by the target speed corrector 36 in the automatic steering computation circuit 29 of the present embodiment. The flowchart of FIG. 15 is substantially the same as the flowchart of the first embodiment shown in FIG. 6. The only difference is step S301. In step S301, the procedure advances to step S201 only when the difference between the target steering angle and the actual steering angle is larger than the threshold value angle δth to correct the target steering angle velocity. In the case where the difference between the target steering angle and the actual steering angle is smaller than the threshold value angle δth, the correction of the target steering angle velocity is not performed, and the target steering angle velocity computed by the target speed computation unit 34 is maintained. Here, it is advisable to set the threshold value angle θth to a value smaller than a value at which the steering torque obtained by experiment or the like is expected to exceed the threshold value 40.

In the power steering apparatus 1 using the control device 2 shown in the present embodiment, correction is not performed when there is given a target steering angle at which the steering torque becomes a small value, whereby it is possible to perform a faster turning. On the other hand, in the case where there is given a target steering angle which will lead to a large steering torque, the automatic steering canceling suppression control is executed to control the power steering apparatus 1 such that no canceling of the automatic steering unintended by the driver occurs.

Fourth Embodiment

Figure 16:
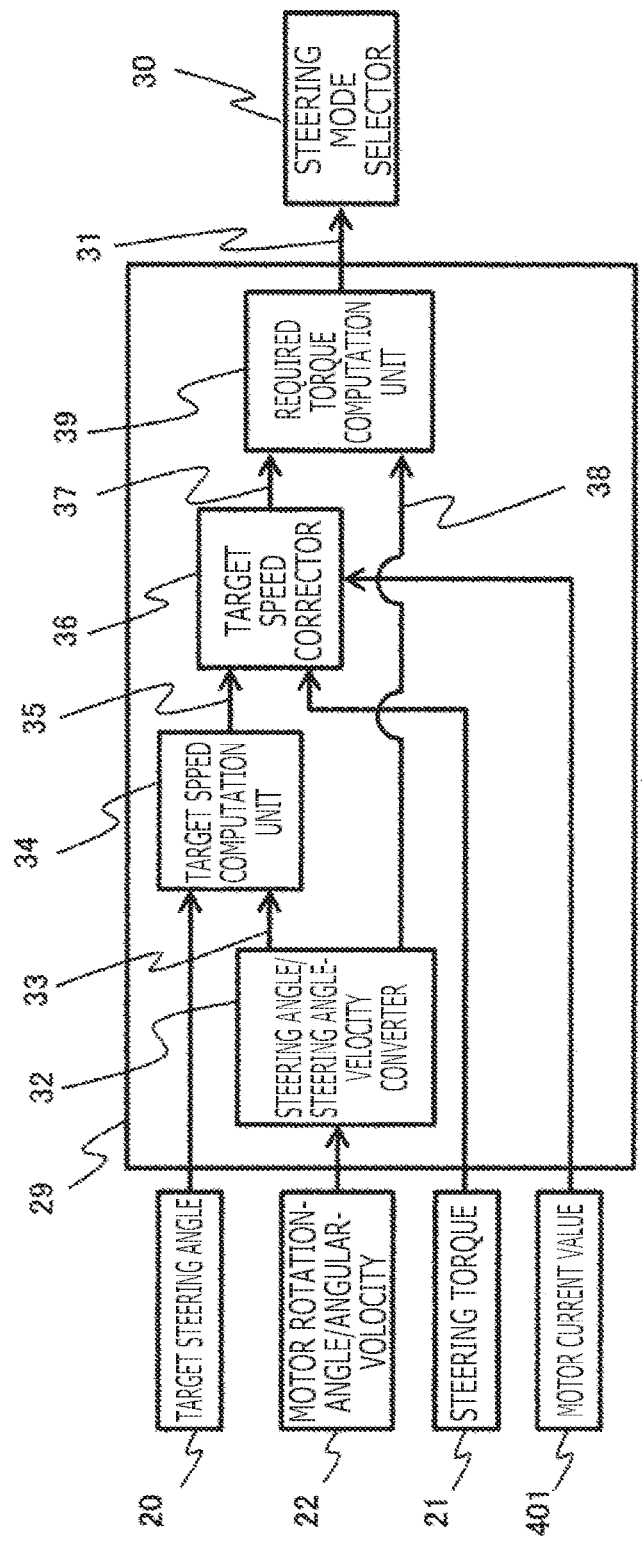
FIG. 16 is a schematic diagram illustrating the construction of the automatic steering computation circuit 29 according to embodiment 4.

FIG. 16 is a schematic diagram illustrating the construction of the automatic steering computation circuit 29 according to the fourth embodiment. It differs from the first embodiment in that a motor electric current value 401 is input to the target speed corrector 36. Otherwise, it is of the same construction as the first embodiment shown in FIG. 4, so a description thereof will be left out.

Figure 17:
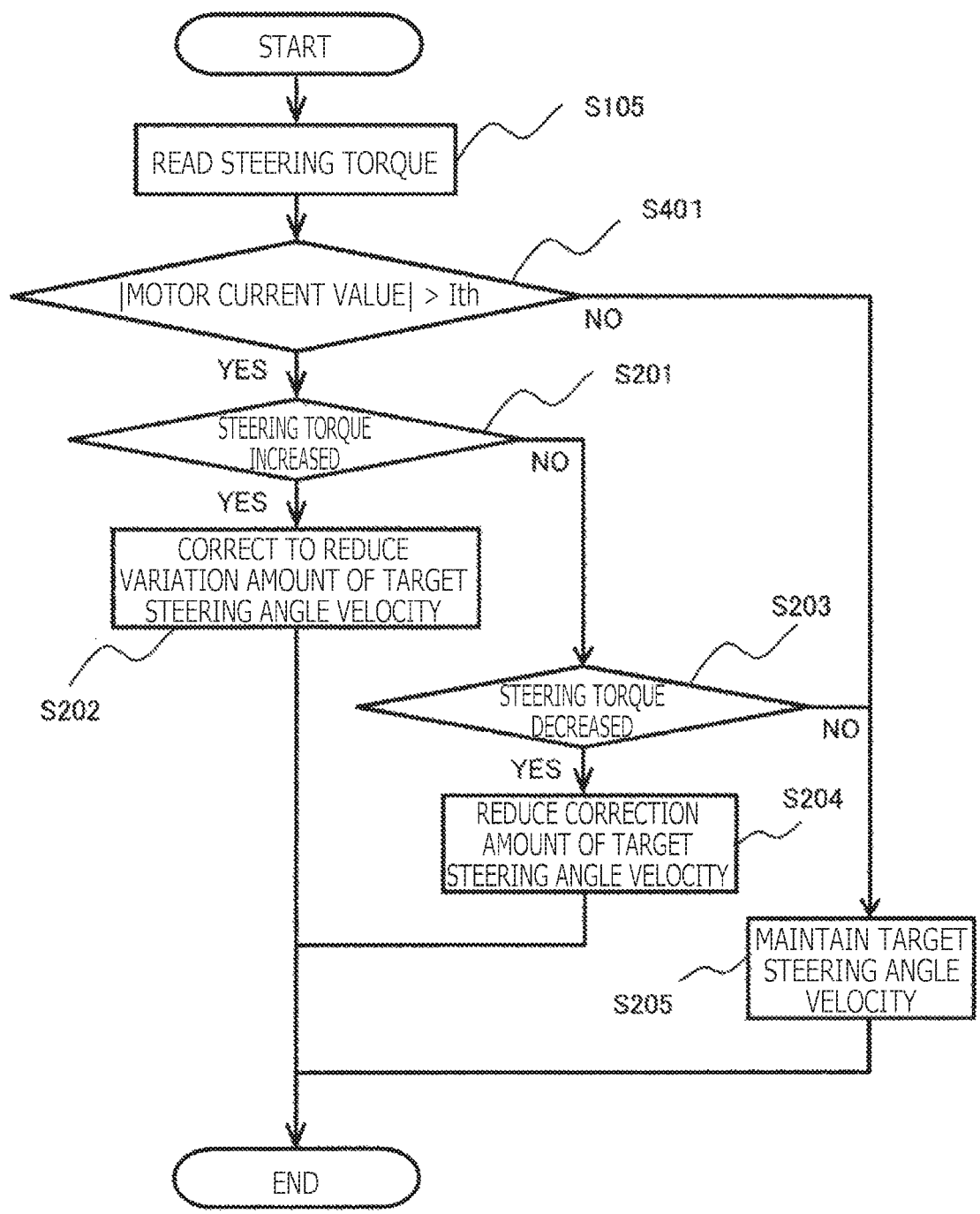
FIG. 17 is a flowchart illustrating the processing by the target speed corrector 34 according to embodiment 4.

FIG. 17 is a flowchart illustrating the processing by the target speed corrector 36 in the automatic steering computation circuit 29 of the present embodiment. The flowchart of FIG. 17 is substantially the same as the flowchart of the first embodiment shown in FIG. 6. The only difference lies in step S401. In step S401, the procedure advances to step S201 only when the magnitude of the motor electric current value 401 is larger than the threshold electric current value Ith to correct the target steering angle velocity. In the case where the motor electric current value 401 is smaller than Ith, the correction of the target steering angle velocity is not performed, and the target steering angle velocity computed by the target speed computation unit 34 is maintained. Here, it is advisable to set the threshold electric current value Ith to a value smaller than a value at which the steering torque obtained by experiment or the like is expected to exceed the threshold value 40.

In the power steering apparatus 1 using the control device 2 shown in the present embodiment, correction is not performed when there is given a target steering angle at which the steering torque becomes a small value, whereby it is possible to perform a faster turning. On the other hand, in the case where there is given a target steering angle which will lead to a large steering torque, the automatic steering canceling suppression control is executed to control the power steering apparatus 1 such that no canceling of the automatic steering unintended by the driver occurs.

Fifth Embodiment

Figure 18:
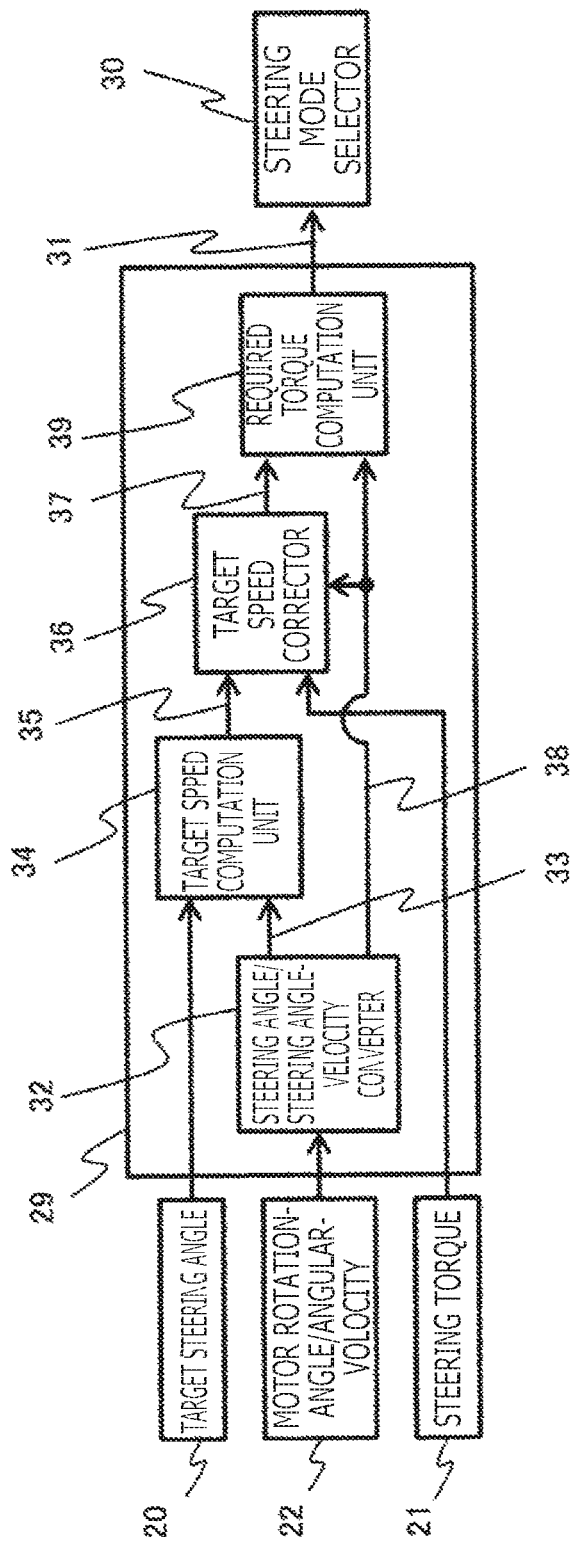
FIG. 18 is a schematic diagram illustrating the construction of the automatic steering computation circuit 29 according to embodiment 5.

FIG. 18 is a schematic diagram illustrating the construction of the automatic steering computation circuit 29 according to the fifth embodiment. It differs from the first embodiment in that the actual steering angle velocity 38 is input to the target speed corrector 36. Otherwise, it is of the same construction as that shown in FIG. 4, so a description thereof will be left out.

Figure 19:
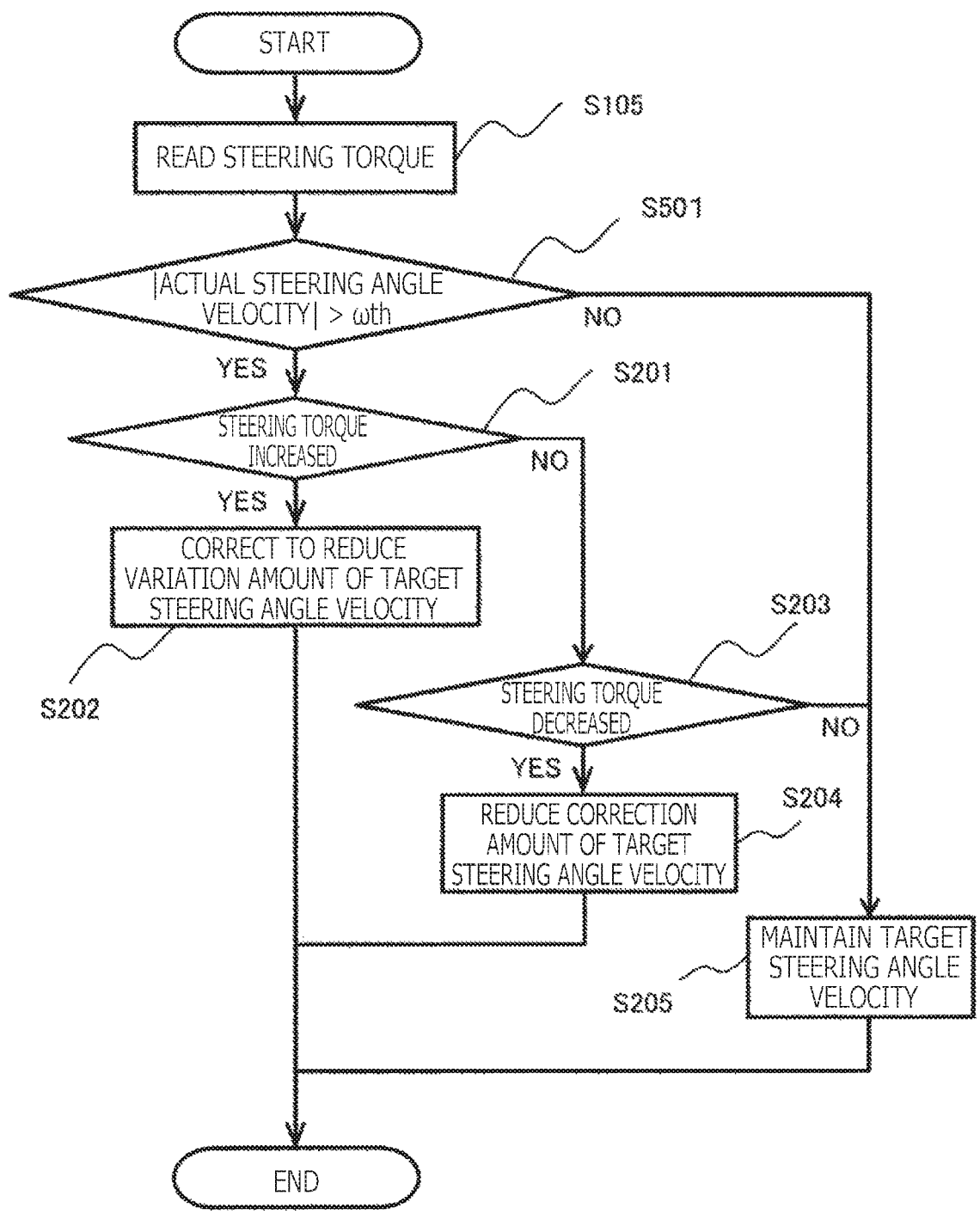
FIG. 19 is a flowchart illustrating the processing by the target speed corrector 34 according to embodiment 5.

FIG. 19 is a flowchart illustrating the processing by the target speed corrector 36 in the automatic steering computation circuit 29 of the present embodiment. The flowchart of FIG. 19 is substantially the same as the flowchart of the first embodiment shown in FIG. 6. The only difference lies in step S501. In step S501, the procedure advances to step S201 only when the magnitude of the actual steering angle velocity 38 is larger than the threshold steering velocity $\omega_{th}$ to correct the target steering angle velocity. In the case where the actual steering angle velocity 38 is smaller than $\omega_{th}$, the correction of the target steering angle velocity is not performed, and the target steering angle velocity computed by the target speed computation unit 34 is maintained. Here, it is advisable to set the threshold steering velocity $\omega_{th}$ to a value smaller than a value at which the steering torque obtained by experiment or the like is expected to exceed the threshold value 40.

In the power steering apparatus 1 using the control device 2 shown in the present embodiment, correction is not performed when there is given a target steering angle at which the steering torque becomes a small value, whereby it is possible to perform a faster turning. On the other hand, in the case where there is given a target steering angle which will lead to a large steering torque, the automatic steering canceling suppression control is executed to control the power steering apparatus 1 such that no canceling of the automatic steering unintended by the driver occurs.

Sixth Embodiment

Figure 20:
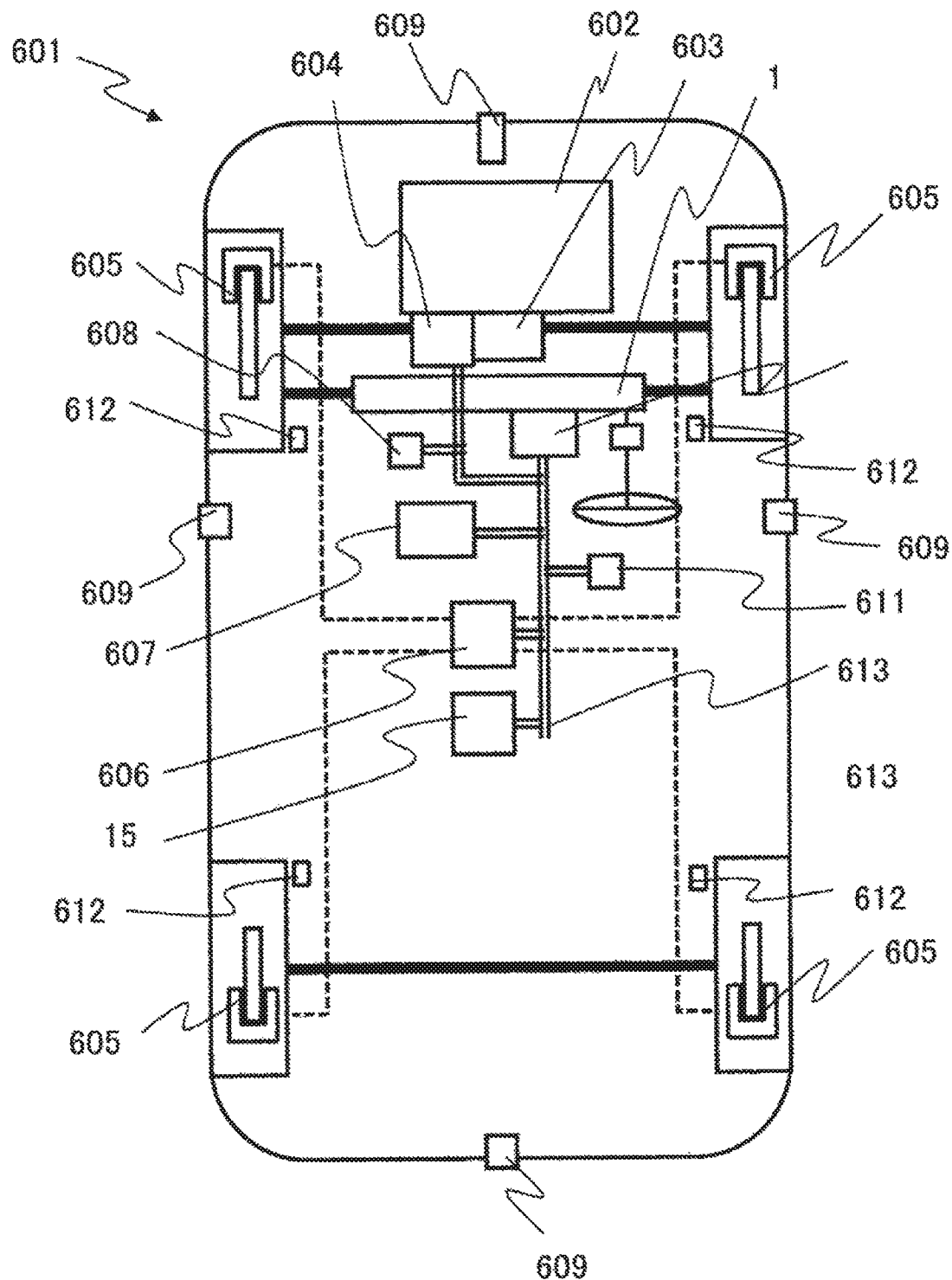
FIG. 20 is a schematic diagram illustrating the construction of a vehicle equipped with the power steering apparatus 1.

FIG. 20 shows, as the sixth embodiment of the present invention, a vehicle 601 equipped with the power steering apparatus control device and the power steering apparatus according to the present invention. The vehicle 601 is equipped with an engine or traveling motor 602, a speed reduction device 603, an engine control device 604, the power steering apparatus 1, the control device 2, a brake device 605, a brake device control device 606, a vehicle-mounted map information presenting device 607, a GPS 608, a sensor 609 such as a camera, a sonar, or a laser radar, a front/rear/lateral acceleration sensor and yaw rate sensor 611, a vehicle speed sensor 612, the host controller 15 performing the motion control of the vehicle, and an in-vehicle LAN 613 such as CAN.

In the vehicle 601 of the present embodiment, the host controller 15 generates the target path for the vehicle 601 based on the positional information of the vehicle 601 obtained by the vehicle-mounted map information presenting device 607 and the GPS 608, and the information on the vehicle motion and the vehicle periphery obtained by the sensor 609 such as a camera, a sonar, or a laser radar, the front/rear/lateral acceleration sensor and yaw rate sensor 611, and the vehicle speed sensor 612. To achieve this target path, the host controller 15 outputs the target speed to the control device 604, the target steering angle to the control device 2, and the target braking force to the control device 606.

The vehicle 601 of the present embodiment is equipped with the electric power steering apparatus 1 described in connection with the first through sixth embodiments. Thus, when there is required a steering at a large steering angle, which is required when, for example, performing automatic parking in a small space, the host controller requires a target steering angle of a high-speed turning angle of a large steering angle. In this process, however, there occurs no automatic steering canceling unintended by the driver.

DESCRIPTION OF REFERENCE CHARACTERS

1: Power steering apparatus
2: Control device
3: Steering mechanism
4: Gear
5: Steering shaft
6: Pinion shaft
7: Rack shaft
8: Speed reduction mechanism
9: Motor
10, 11: Turning wheel
12: Torque sensor
13: Belt/pulley
14: Ball screw
15: Host controller
16: Input terminal
17: Output terminal
18: Power source
19: Automatic steering flag
20: Target steering angle
21: Steering torque value
22: Motor rotational angle, angular velocity
23: Vehicle condition signal
24: Motor control electric current value
25: Operating condition signal
26: Required torque generation unit
27: Motor driving unit
28: Assist computation circuit
29: Automatic steering computation circuit
30: Control selector
31: Required torque
32: Steering-angle/steering-angle-velocity converter
33: Actual steering angle
34: Target speed computation unit
35: Target steering speed
36: Target speed corrector
37: Corrected target steering angle velocity
38: Actual steering angle velocity
39: Required torque computation unit
40: Steering torque threshold value
41, 48: Time change of the steering angle
42, 49: Time change of the target steering angle velocity
43, 50: Time change of the steering torque
44, 51: Target steering angle $\delta r$ generated by the host controller 15
45, 52: Actual steering angle $\delta$
46, 54: Target steering angle velocity $\omega r$
47, 55: Steering torque
53: Corrected target steering angle velocity $\omega m$

The invention claimed is:

1. A control device in which there is selected either an assist control in which a steering force is assisted based on a steering torque input through an operation of a steering wheel or an automatic steering control in which a steering angle of a turning wheel is controlled based on a steering angle command value to control an operation of a power steering apparatus, wherein
when, in a state in which the automatic steering control is selected, the steering torque exceeds a predetermined threshold value, the automatic steering control is canceled and the assist control is selected, and
there is set a steering angle velocity command value in accordance with an increase amount of the steering torque due to turning based on the automatic steering control, whereby there is performed a canceling suppression control in which canceling of the automatic steering control is suppressed.

2. The control device according to claim 1, wherein the steering angle velocity command value is set such that as the steering torque due to the turning based on the automatic steering control increases, a correction amount from a target steering angle velocity calculated from a steering angle difference which is a difference between an actual steering angle of the turning wheel and the steering angle command value increases.

3. The control device according to claim 2, wherein as the steering torque due to the turning based on the automatic steering control decreases, control is performed to cause the steering angle velocity command value to approach the target steering angle velocity.

4. The control device according to claim 3, wherein control is performed to cause the steering angle velocity command value to approach the target steering angle velocity such that the steering torque does not exceed a predetermined threshold value.

5. The control device according to claim 1, wherein the steering angle velocity command value is obtained through feedback control based on the steering torque.

6. The control device according to claim 1, further comprising a steering angle velocity control unit computing an output torque command value of a motor controlling the steering angle of the turning wheel based on the steering angle velocity command value.

7. The control device according to claim 1, wherein the steering torque is detected by torque detection means provided between the steering wheel and the turning wheel.

8. The control device according to claim 7, wherein the canceling suppression control controls the steering angle velocity on a side of the turning wheel rather than the torque detection means.

9. The control device according to claim 8, wherein
the control device computes the output torque of the motor controlling the steering angle of the turning wheel, and
the steering angle velocity on the turning wheel side is controlled based on an output of a rotational angle sensor detecting a rotational angle of the motor.

10. The control device according to claim 1, wherein the canceling suppression control is performed in a case where the difference between the target steering angle and the actual steering angle of the turning wheel is a predetermined value or more.

11. The control device according to claim 1, wherein the canceling suppression control is performed in a case where an electric current flowing through the motor controlling the steering angle of the turning wheel is a predetermined value or more.

12. The control device according to claim 1, wherein the canceling suppression control is performed in a case where the steering angle velocity of the turning wheel is a predetermined value or more.

13. A power steering apparatus which operates by either an assist control in which a steering force is assisted based on a steering torque input through an operation of a steering wheel or an automatic steering control in which a steering angle of a turning wheel is controlled based on a steering angle command value, wherein
when, in a state in which the automatic steering control is performed, the steering torque exceeds a predetermined threshold value, the automatic steering control is canceled and operation is performed by the assist control, and
there is set a steering angle velocity command value in accordance with an increase amount of the steering torque due to turning based on the automatic steering control, whereby there is performed a canceling suppression control in which canceling of the automatic steering control is suppressed.

14. The power steering apparatus according to claim 13, wherein the steering angle velocity command value is set such that as the steering torque due to the turning based on the automatic steering control increases, the correction amount from the target steering angle velocity calculated from a steering angle difference which is a difference between an actual steering angle of the turning wheel and the steering angle command value increases.

15. The power steering apparatus according to claim 14, wherein as the steering torque due to the turning based on the automatic steering control decreases, control is performed to cause the steering angle velocity command value to approach the target steering angle velocity.

16. The power steering apparatus according to claim 13, wherein the steering angle velocity command value is obtained through feedback control based on the steering torque.

17. The power steering apparatus according to claim 13, further comprising a steering angle velocity control unit computing an output torque command value of a motor controlling the steering angle of the turning wheel based on the steering angle velocity command value.

18. The power steering apparatus according to claim 13, wherein the steering torque is detected by torque detection means provided between the steering wheel and the turning wheel.

19. The power steering apparatus according to claim 18, wherein the canceling suppression control controls the steering angle velocity on a side of the turning wheel rather than the torque detection means.

20. The power steering apparatus according to claim 19, wherein
the control device computes an output torque of the motor controlling the steering angle of the turning wheel, and
the steering angle velocity on the turning wheel side is controlled based on an output of a rotational angle sensor detecting the rotational angle of the motor.

* * * * *